United States Patent [19]
Sasaki et al.

[11] Patent Number: 5,293,490
[45] Date of Patent: Mar. 8, 1994

[54] DATA BUFFERING DEVICE HAVING SIMPLE DATA READING AND/OR STORING FUNCTION

[75] Inventors: Ichiro Sasaki; Kouzi Nakayama, both of Nagoya, Japan

[73] Assignee: Brother Kogyo Kabushiki Kaisha, Aichi, Japan

[21] Appl. No.: 54,821

[22] Filed: Apr. 30, 1993

Related U.S. Application Data

[63] Continuation of Ser. No. 487,185, Mar. 1, 1990, abandoned.

[30] Foreign Application Priority Data

Mar. 6, 1989 [JP] Japan .................................. 1-53222

[51] Int. Cl.⁵ ............................................. G06F 13/28
[52] U.S. Cl. ............................ 395/250; 364/DIG. 1;
364/239.5; 364/244.3; 364/247.7; 364/239.6
[58] Field of Search ................................. 395/250, 425

[56] References Cited

U.S. PATENT DOCUMENTS 4,423,482 12/1983 Hargrove et al. .................. 395/325
4,658,349 4/1987 Tabata et al. ...................... 395/425
5,003,471 3/1991 Gibson .............................. 395/250

FOREIGN PATENT DOCUMENTS 2486290 6/1981 France .
121432 7/1984 Japan .

OTHER PUBLICATIONS

J. A. Appel et al.: A High Capacity FASTBUS Multiple Event Buffer; IEEE Transactions on Nuclear Science; vol. NS-32, No. 1, Feb. 1985; pp. 105-107.

Primary Examiner—Debra A. Chun
Attorney, Agent, or Firm—Oliff & Berridge

[57] ABSTRACT

A data buffering device having a data buffer permitting data storage in a first storage area A while the area A is advanced over a predetermined number of storage areas of the buffer in a predetermined sequence and permitting data reading from a second storage area B while the area B is advanced in the same sequence; a first device judging whether or not it is permissible to carry out at least one of a simple data storage and a simple data reading; a second device executing, if the judgement of the first device is negative, a return judgement whether or not it is necessary to return a corresponding one, or each, of the areas A and B to a leading storage area of the buffer, and a possibility judgement whether or not the buffer has at least a predetermined number of storage area or areas permitting a corresponding one, or each, of a data storage and a data reading, if the possibility judgement is affirmative the second device placing the first device in a condition in which the first device provides an affirmative judgement, and carrying out the corresponding one or each of the data storage and reading; and a third device carrying out, if the judgement of the first device is affirmative, the at least one of the simple data storage and reading, without the return and possibility judgements of the second device.

23 Claims, 14 Drawing Sheets

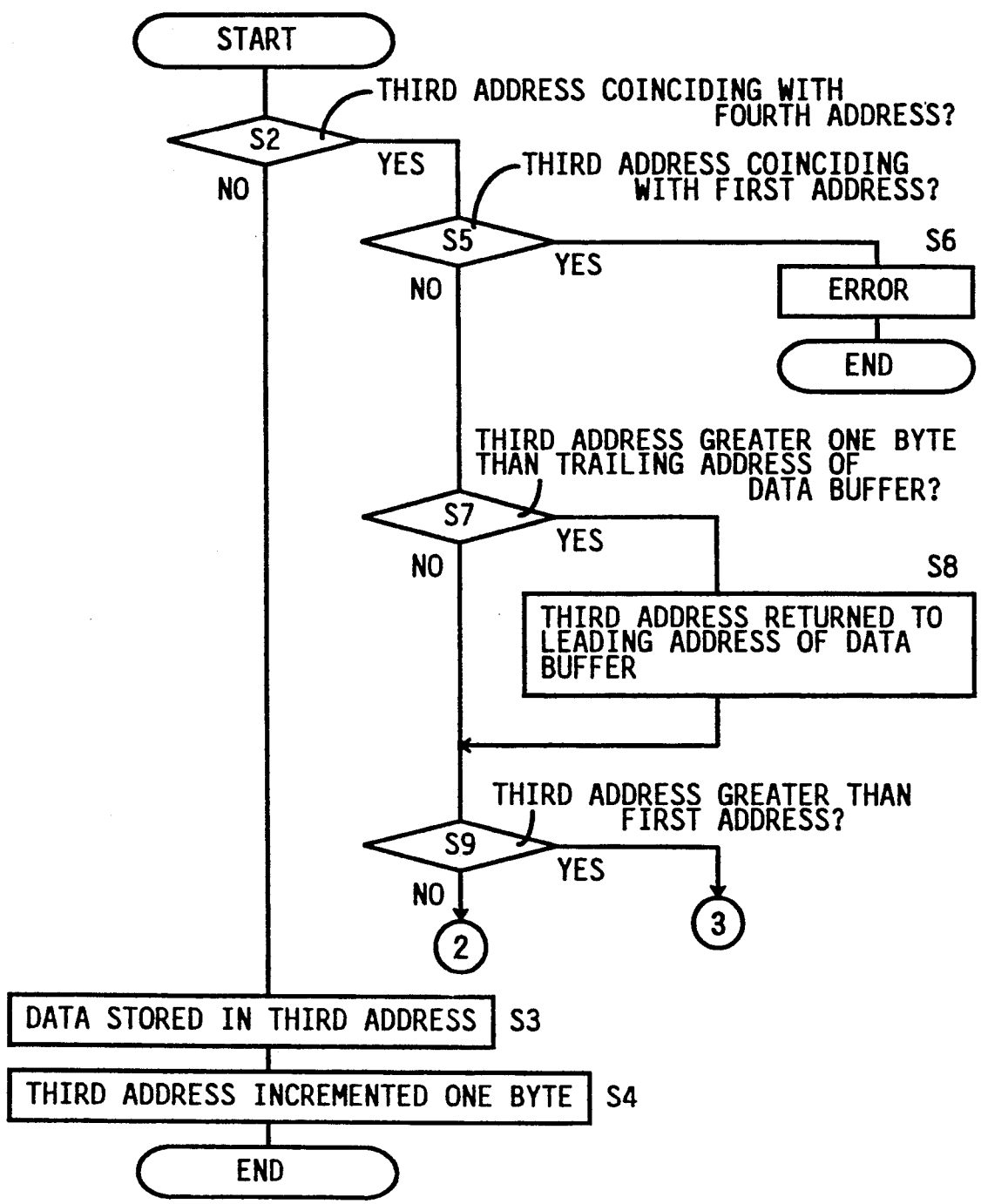

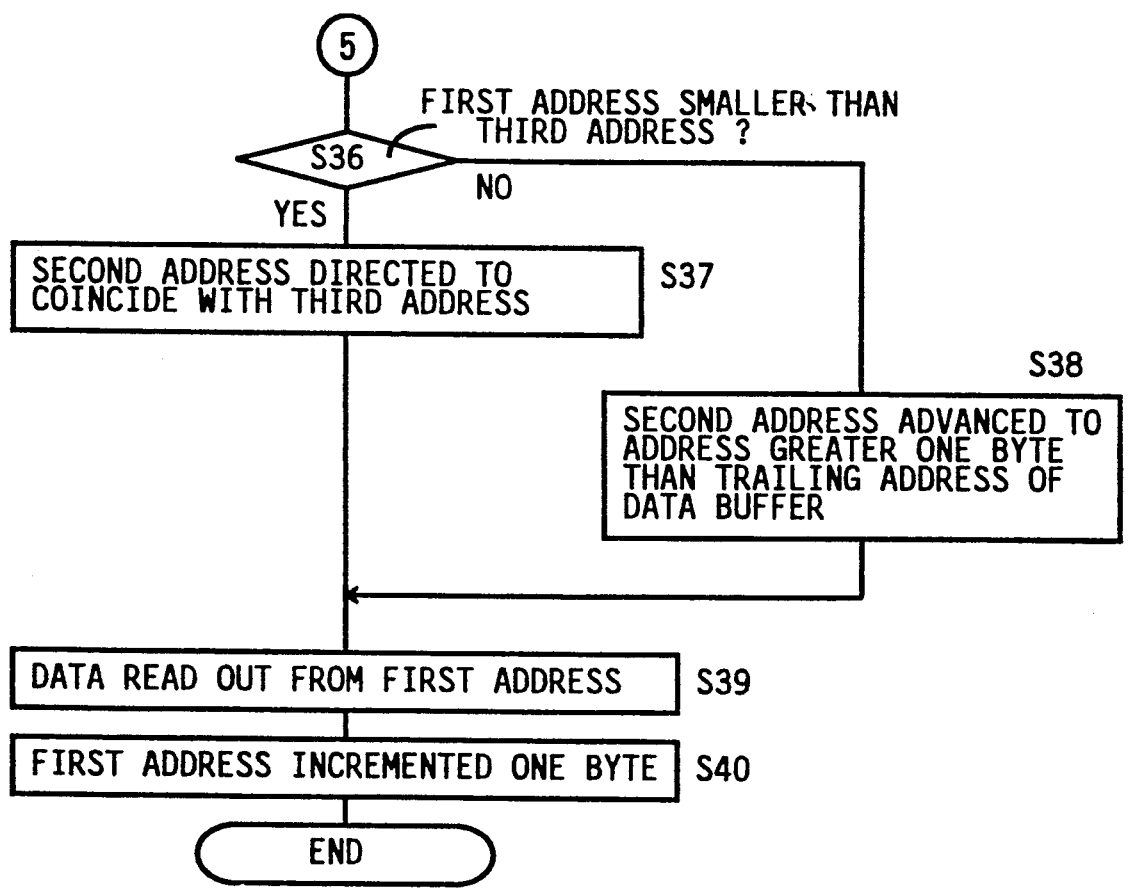

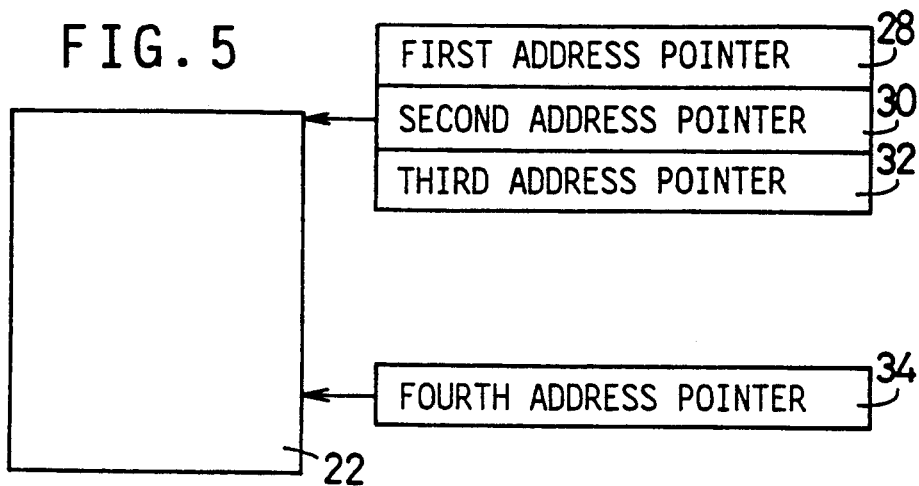
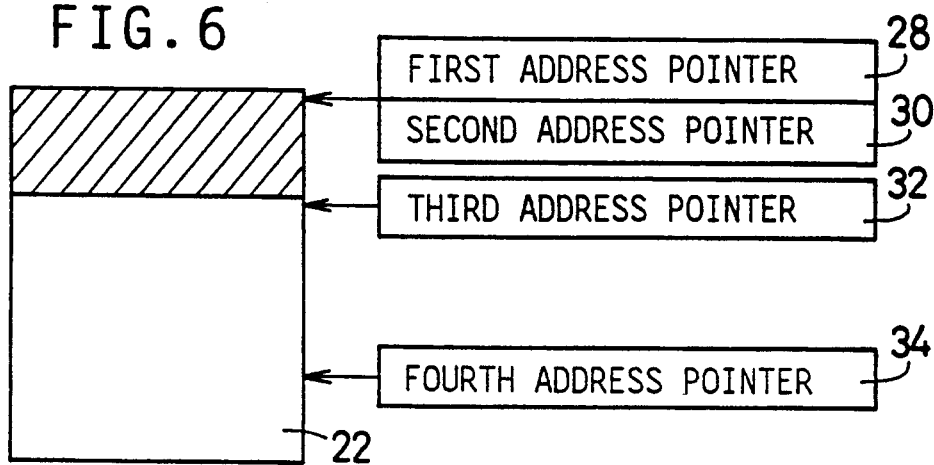
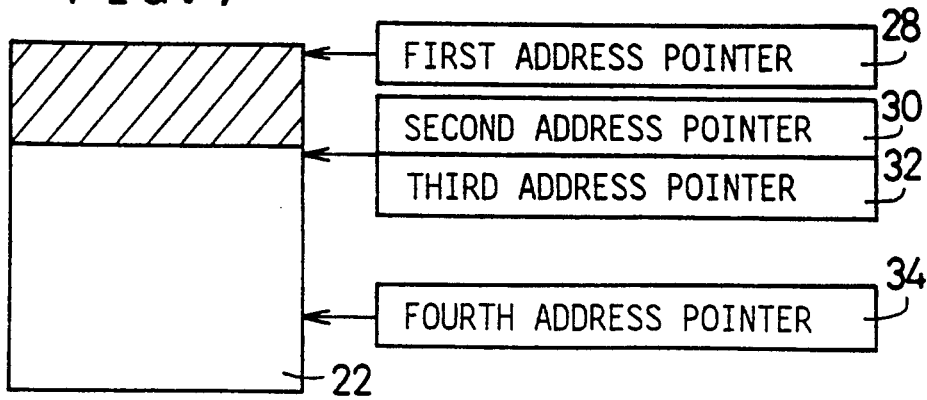

5,293,490

DATA BUFFERING DEVICE HAVING SIMPLE DATA READING AND/OR STORING FUNCTION

This is a continuation of application Ser. No. 07/487,185 filed Mar. 1, 1990, now abandoned.

BACKGROUND OF THE INVENTION

1. Field of the Invention

The present invention relates to a data buffering device having a data buffer which permits plural sets of data to be stored one set by one therein such that each set of data is stored in a first storage area as the first storage area is advanced from one area to another over a predetermined number of storage areas of the buffer in a predetermined sequence, and which permits the stored sets of data to be read out one set by one therefrom in the same sequence such that each set of data is read out from a second storage area as the second storage area is advanced from one area to another over the storage areas in the sequence. The present invention particularly relates to improving the processing rate or speed of at least one of data storage in the buffer and data reading from the buffer.

2. Related Art Statement

The data buffering device as indicated above is used for, for example, a printer which is connected to a print data supply such as a personal computer or a word processor and serves as an output unit of the data supply. The data supply supplies print data such as code data or vector data to the printer. The printer has processing means for converting the print data to dot data, and printing means for carrying out printing according to the dot data. More specifically, the data buffering device has a data buffer which permits plural sets of print data supplied from the data supply to be stored one set by one therein such that each set of data out of the supplied sets of data is stored in a first storage area as the first storage area is moved or advanced from one area to another over a predetermined number of storage areas of the buffer in a predetermined sequence, and which permits the stored sets of data to be read out one set by one therefrom in the same sequence such that each set of data out of the stored sets of data is read out from a second storage area as the second storage area is advanced from one area to another over the storage areas in the sequence. The print data read out from the data buffer is converted into dot data, and printing is carried out according to the dot data. Thus, the data buffering device assures that the printer carries out printing in a reliable manner even if a data storage in the buffer and a data reading from the buffer do not synchronize with each other, or even if processing speeds (or cycle times) of a data storage and a data reading do not match each other. These data buffering devices find various applications, other than use for printers, in which the above-described advantageous function thereof is required.

In a data buffering device, data storage in, or data reading from, a data buffer thereof is started from a head or leading storage area (or leading address) of the buffer and is advanced in a predetermined sequence to a last or trailing storage area (or trailing address) of the buffer. In other words, the above-indicated first or second storage area is advanced in the predetermined sequence from the leading address to the trailing address of the buffer. If the first or second storage area comes to the trailing address, then the area is required to return to the leading address so that data storage or reading can further be advanced from the leading address. Meanwhile, if the data buffer has no storage area which permits data storage therein, or no storage area which has data stored therein and permits data reading therefrom, it is not permissible to carry out data storage or reading on the buffer. Therefore, the data buffering device is required to have judgements-executing means for executing a return judgement whether or not it is necessary to return the first or second storage area from the trailing address of the buffer to the head address thereof, and executing a possibility judgement whether or not the buffer has any storage area that permits data storage therein or data reading therefrom. Conventional data buffering devices are adapted to execute these return and possibility judgements each time a set of data is stored in, or read out from, the data buffer thereof.

Thus, the conventional data buffering devices suffer from the problem that a comparatively long time is needed for a data storage in the data buffer or a data reading from the buffer, that is, that the rate or speed of data storage or data reading is unsatisfactory.

SUMMARY OF THE INVENTION

It is therefore an object of the present invention to provide a data buffering device which is capable of processing (or buffering) data at high speed by minimizing the times of execution of the return and possibility judgements for at least one of data storage and data reading and thereby shortening the total time needed for the buffering of the data.

The above object has been achieved by the present invention, which provides a data buffering device comprising (a) a data buffer including a predetermined number of storage areas, the data buffer permitting plural sets of data to be stored one set by one therein such that each set of data out of the plural sets of data is stored in a first storage area as the first storage area is advanced from one area to another over the storage areas in a predetermined sequence, the data buffer permitting the stored sets of data to be read out one set by one therefrom in the predetermined sequence such that each set of data out of the stored sets of data is read out from a second storage area as the second storage area is advanced from one area to another over the storage areas in the predetermined sequence, (b) first means for judging whether or not it is permissible to carry out at least one of a simple data storage in the data buffer and a simple data reading from the data buffer, (c) second means for, if the judgement of the first means is negative, executing a return judgement whether or not it is necessary to return a corresponding one, or each, of the first and second storage areas to a leading storage area of the data buffer in the predetermined sequence, and a possibility judgement whether or not the data buffer has at least a predetermined number of storage area or areas permitting a corresponding one, or each, of a data storage and a data reading, if a result of the return judgement is affirmative the second means returning the corresponding one, or the each, of the first and second storage areas to the leading storage area, if a result of the possibility judgement is affirmative the second means placing the first means in a condition in which the first means judges that it is permissible to carry out the at least one of the simple data storage and the simple data reading, and carrying out the corresponding one, or the each, of the data storage and the data reading, and (d) third means for, if the judgement of the first means is affirmative, carrying out the at least one of the simple data storage in the data buffer and the simple data reading from the data buffer, without the return judgement and the possibility judgement of the second means.

In the data buffering device constructed as described above, the second means executes the return and possibility judgements only in the event that the judgement of the first means is negative. Stated differently, in the event that the judgement of the first means is affirmative, the return and possibility judgements are not carried out, and the third means carries out a data storage in the data buffer or a data reading from the buffer. This is a simple data processing (storage or reading).

A time needed for execution of the return and possibility judgements of the second means of the invention device is generally equal to that needed in the conventional data buffering devices. In contrast, a time needed for carrying out the simple data storage or reading in the invention device is even shorter. Since a highly major proportion of the data (sets of data) to be stored in, or read out from, the data buffer is treated in the manner of the simple data storage or reading, the total processing time exhibited by the invention device is remarkably short as compared with that of the conventional devices. An experiment shows that the invention device stores more than 95% of the data supplied thereto in the manner of the simple data storage, and reads out more than 95% of the stored data in the manner of the simple data reading. Thus, the present data buffering device is capable of remarkably reducing the total time needed for the buffering (storage and/or reading) of data.

In the invention device an additional time is needed for execution of the judgement of the first means, as compared with the conventional data buffering devices. However, this time is much shorter than a time needed for execution of the return and possibility judgements of the conventional devices. In other words, the present data buffering device is capable of reducing the data processing time as a whole.

In the case where the principle of the present invention is applied to both data storage and data reading, the data processing time is most advantageously reduced. It is however understood that the data processing time is reduced to an appreciable extent by applying the principle of the invention to one of data storage and data reading.

In a preferred embodiment of the present invention, the first means comprises a first address pointer indicating a first address corresponding to the second storage area; a second address pointer indicating a second address greater by one than an address corresponding to a trailing storage area of a simple data reading permitting area permitting the simple data reading; and judging means for judging whether or not the first address coincides with the second address, if the judgement of the judging means is negative the first means judging that it is permissible to carry out the simple data reading. In this embodiment, the second means may comprise return judgement means for, if the judgement of the judging means of the first means is affirmative, judging whether or not the first address pointer indicates as the first address an address greater by one than a trailing address corresponding to a trailing storage area of the data buffer in the predetermined sequence; and returning means for, if the judgement of the return judgement means is affirmative, directing the first address pointer to indicate as the first address a leading address corresponding to a leading storage area of the data buffer in the predetermined sequence.

In another embodiment of the present invention, the first means comprises a third address pointer indicating a third address corresponding to the first storage area; a fourth address pointer indicating a fourth address greater by one than an address corresponding to a trailing storage area of a simple data storage permitting area permitting the simple data storage; and judging means for judging whether or not the third address coincides with the fourth address, if the judgement of the judging means is negative the first means judging that it is permissible to carry out the simple data storage. In this embodiment, second means may comprise return judgement means for, if the judgement of the judging means of the first means is affirmative, judging whether or not the third address pointer indicates as the third address an address greater by one than a trailing address corresponding to a trailing storage area of the data buffer in the predetermined sequence; and returning means for, if the judgement of the return judgement is affirmative, directing the third address pointer to indicate as the third address a leading address corresponding to a leading storage area of the data buffer in the predetermined sequence.

In yet another embodiment of the present invention, the first means comprises a first address pointer indicating a first address corresponding to the second storage area; a second address pointer indicating a second address greater by one than an address corresponding to a trailing storage area of a simple data reading permitting area permitting the simple data reading; first judging means for judging whether or not the first address coincides with the second address, if the judgement of the first judging means is negative the first means judging that it is permissible to carry out the simple data reading; a third address pointer indicating a third address corresponding to the first storage area; a fourth address pointer indicating a fourth address greater by one than an address corresponding to a trailing storage area of a simple data storage permitting area permitting the simple data storage; and second judging means for judging whether or not the third address coincides with the fourth address, if the judgement of the second judging means is negative the first means judging that it is permissible to carry out the simple data storage.

According to a feature of the above embodiment, the second means comprises directing means for directing the fourth address pointer to indicate the fourth address such that normally there are left more than a predetermined number of storage areas from the fourth address to the first address as seen in said predetermined sequence; and inhibiting means for, if the directing means has failed to leave more than the predetermined number of storage areas between the fourth and first addresses, generating a signal to command a cease of data supply to the data buffer.

According to another feature of the same embodiment, thee second means comprises return judgement means for, if the judgement of the first judging means of the first means is affirmative, whether or not the first address pointer indicates as the first address an address greater by one than a trailing address corresponding to a trailing storage area of the data buffer in the predetermined sequence; returning means for, if the judgement of the return judgement means is affirmative, directing the first address pointer to indicate as the first address a leading address corresponding to a leading storage area of the data buffer in the predetermined sequence; and directing means for, after the first address pointer has indicated the leading address, directing the second address pointer to indicate as the second address such that the second address coincides with the third address.

According to yet another feature of the same embodiment, the second means comprises return judgement means for, if the judgement of the first judging means of the first means is affirmative, judging whether or not the first address pointer indicates as the first address an address greater by one than a trailing address corresponding to a trailing storage area of the data buffer in the predetermined sequence; returning means for, if the judgement of the return judgement means is affirmative, directing the first address pointer to indicate as the first address a leading address corresponding to a leading storage area of the data buffer in the predetermined sequence; and directing means for, if the judgement of the return judgement means is negative and if the first address is smaller than the third address, directing the second address pointer to indicate the second address such that the second address coincides with the third address, and, if the judgement of the return judgement means is negative and if the first address is not smaller than the third address, directing the second address pointer to indicate as the second address an address greater by one than the trailing address.

According to a further feature of the same embodiment, the second means comprises directing and inhibiting means for, if the judgement of the second judging means of the first means is affirmative, if the third address is not greater than the first address, and if there are not left more than a predetermined number of storage areas from the third address to the first address as seen in the predetermined sequence, directing the fourth address pointer to indicate the fourth address such that the fourth address coincides with the third address, and generating a signal to command a cease of data supply to the data buffer.

According to yet another feature of the same embodiment, the second means comprises directing means for, if the judgement of the second judging means of the first means is affirmative, if the third address is greater than the first address, and if there are left more than a predetermined number of storage areas from the third address to a trailing address corresponding to a trailing storage area of the data buffer as seen in the predetermined sequence, directing the fourth address pointer to indicate as the fourth address an address greater by one than an address which is smaller by a number of the predetermined number of storage areas than the trailing address, and if the judgement of the second judging means of the first means is affirmative, if the third address is not greater than the first address, and if there are left more than the predetermined number of storage areas from the third address to the first address as seen in the predetermined sequence, directing the fourth address pointer to indicate as the fourth address an address greater by one than an address which is smaller by the above-indicated number than the first address. In this case, the second means may further comprise judging and directing means for, if the judgement of the second judging means of the first means is affirmative, if the third address is greater than the first address, and if there are not left more than the predetermined number of storage areas from the third address to the trailing address as seen in the predetermined sequence, judging whether or not there are left more than the predetermined number of storage areas from the leading storage area of the data buffer to the first address as seen in the predetermined sequence, and, if the judgement thereof is affirmative, directing the fourth address pointer to indicate as the fourth address an address greater by one than the trailing address. In the same case, the second means may further comprise directing and inhibiting means for, if the judgement of the judging and directing means is negative, directing the fourth address pointer to indicate the fourth address such that the fourth address coincides with the third address, and generating a signal to command a cease of data supply to the data buffer.

In a further embodiment of the present invention, the first means comprises a memory indicating an amount of a simple data reading permitting area permitting the simple data reading; and judging means for judging whether or not the amount indicated by the memory is greater than zero, and if the judgement of the judging means is affirmative, judges that it is permissible to carry out the simple data reading.

In another embodiment of the present invention, the first means comprises a memory indicating an amount of a simple data storage permitting area permitting the simple data storage; and judging means for judging whether or not the amount indicated by the memory is greater than zero, and if the judgement of the judging means is affirmative, judges that it is permissible to carry out the simple data storage.

In a further embodiment of the present invention, the first means comprises indicator means for indicating a state of said data buffer; and judging means for judging based on said indicator means whether or not it is permissible to carry out the at least one of the simple data storage and the simple data reading.

According to a feature of the above embodiment, the indicator means comprises an address pointer indicating an address greater by one than a trailing address corresponding to a trailing storage area of a data buffering permitting area permitting the at least one of the simple data storage and the simple data reading.

According to another feature of the same embodiment, the indicator means comprises a memory indicating an amount of a data buffering permitting area permitting the at least one of the simple data storage and the simple data reading.

BRIEF DESCRIPTION OF THE DRAWINGS

The above and optional objects, features and advantages of the present invention will be better understood by reading the following detailed description of the presently preferred embodiments of the invention, when considered in conjunction with the accompanying drawings, in which:

FIGS. 2, 3A, 3B, 3C, 4A and 4B are flow charts representing control programs related to data storage and data reading carried out by a process center of the data buffering device of FIG. 1;

FIGS. 5-15 are views showing different states of a data buffer of the data buffering device of FIG. 1;

DETAILED DESCRIPTION OF THE PREFERRED EMBODIMENTS

Figure 1:
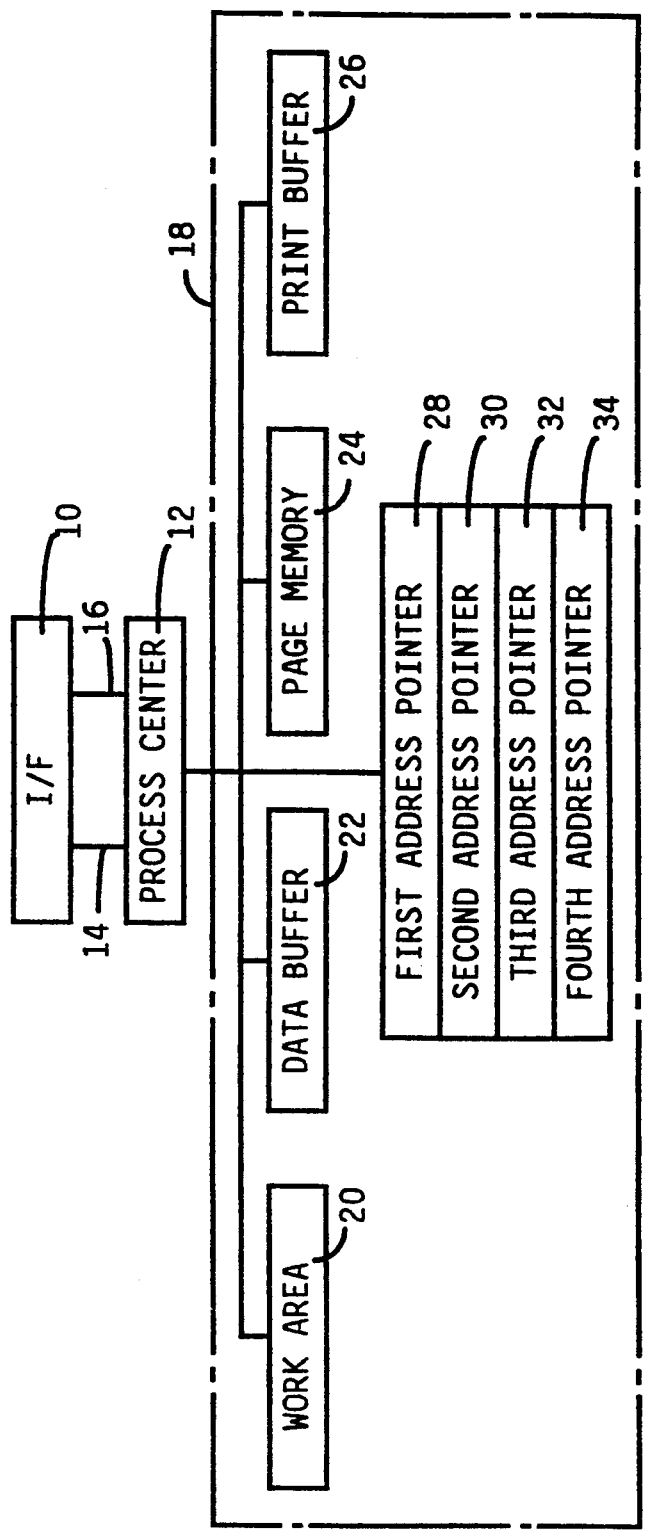
FIG. 1 is a diagrammatic view of a data buffering device for a laser printer, which embodies the present invention.
Figure 2:
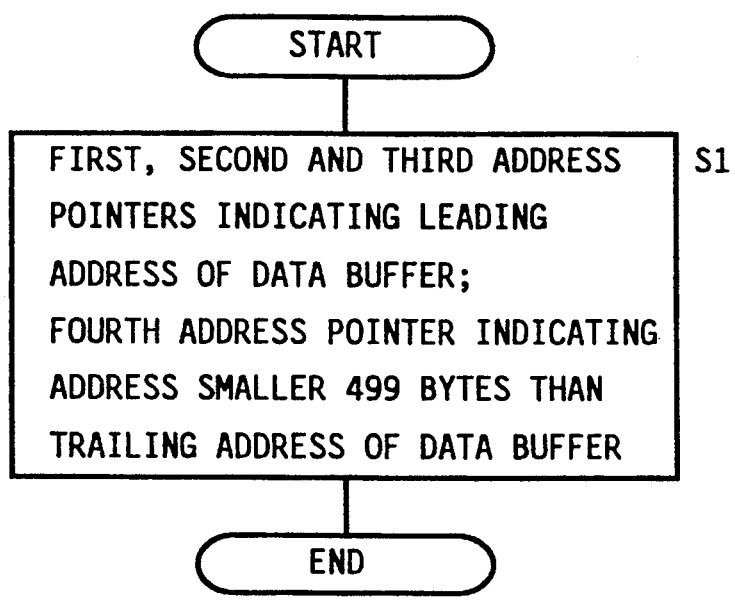
Figure 3B:
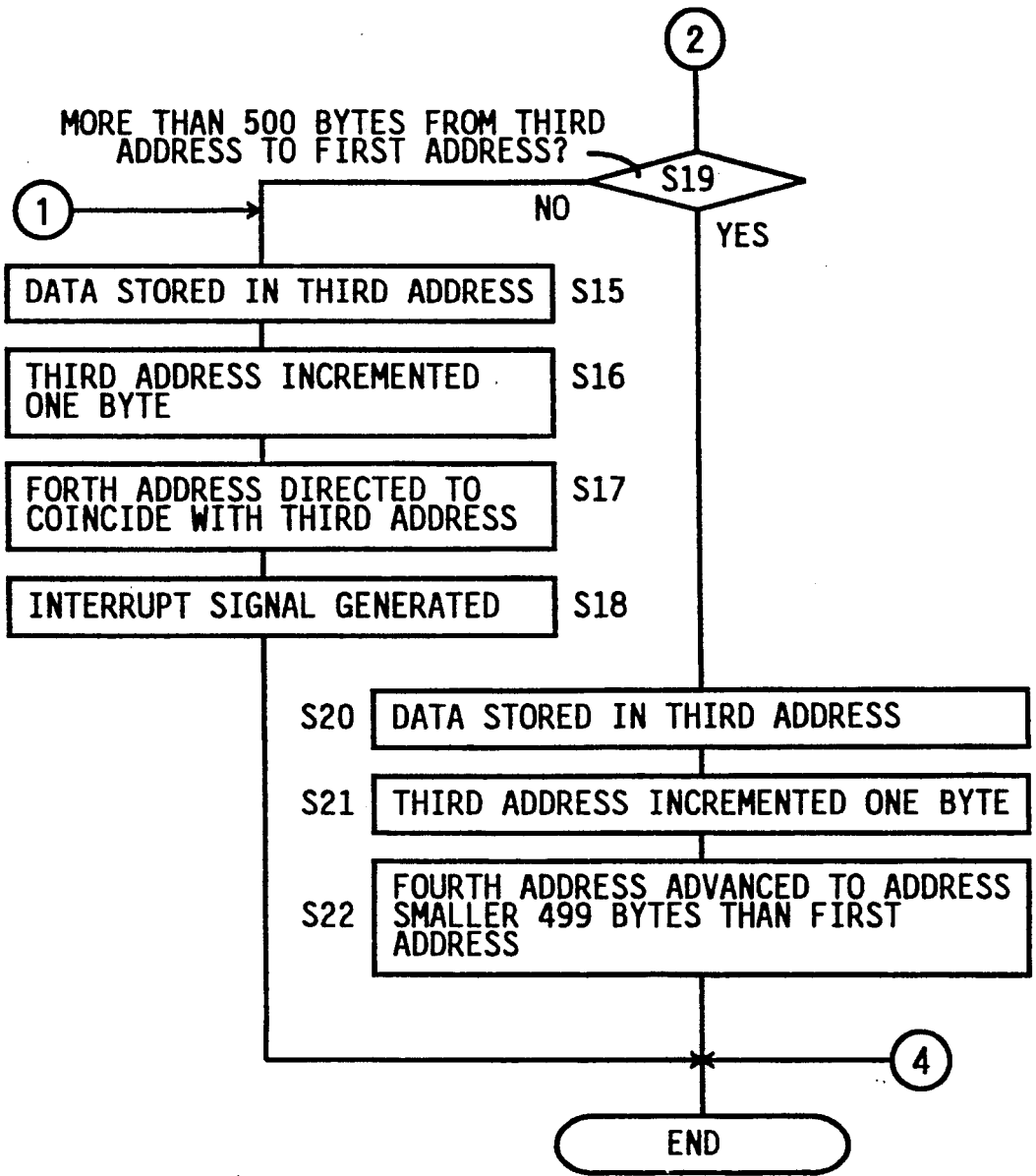
Figure 3C:
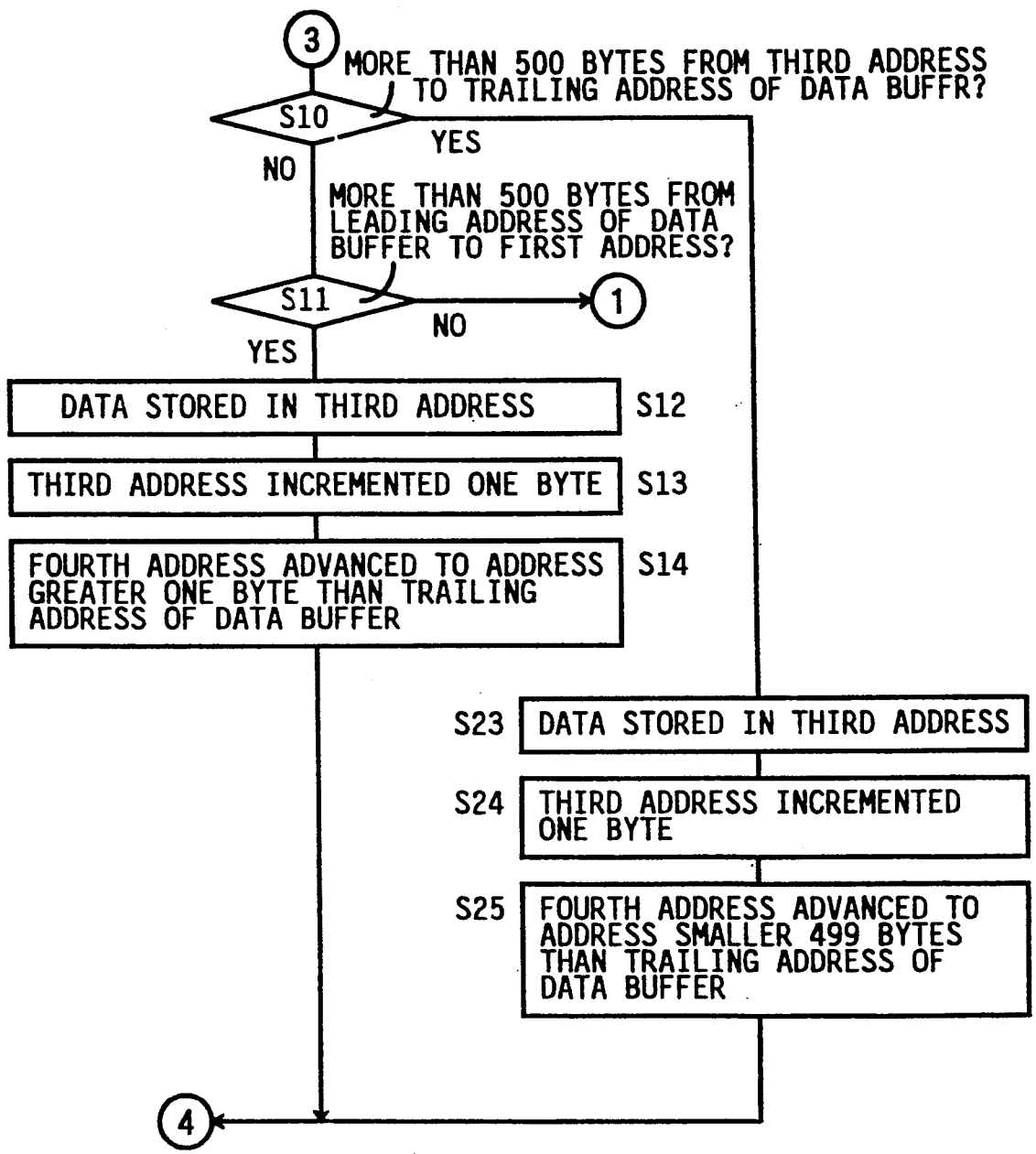
Figure 4A:
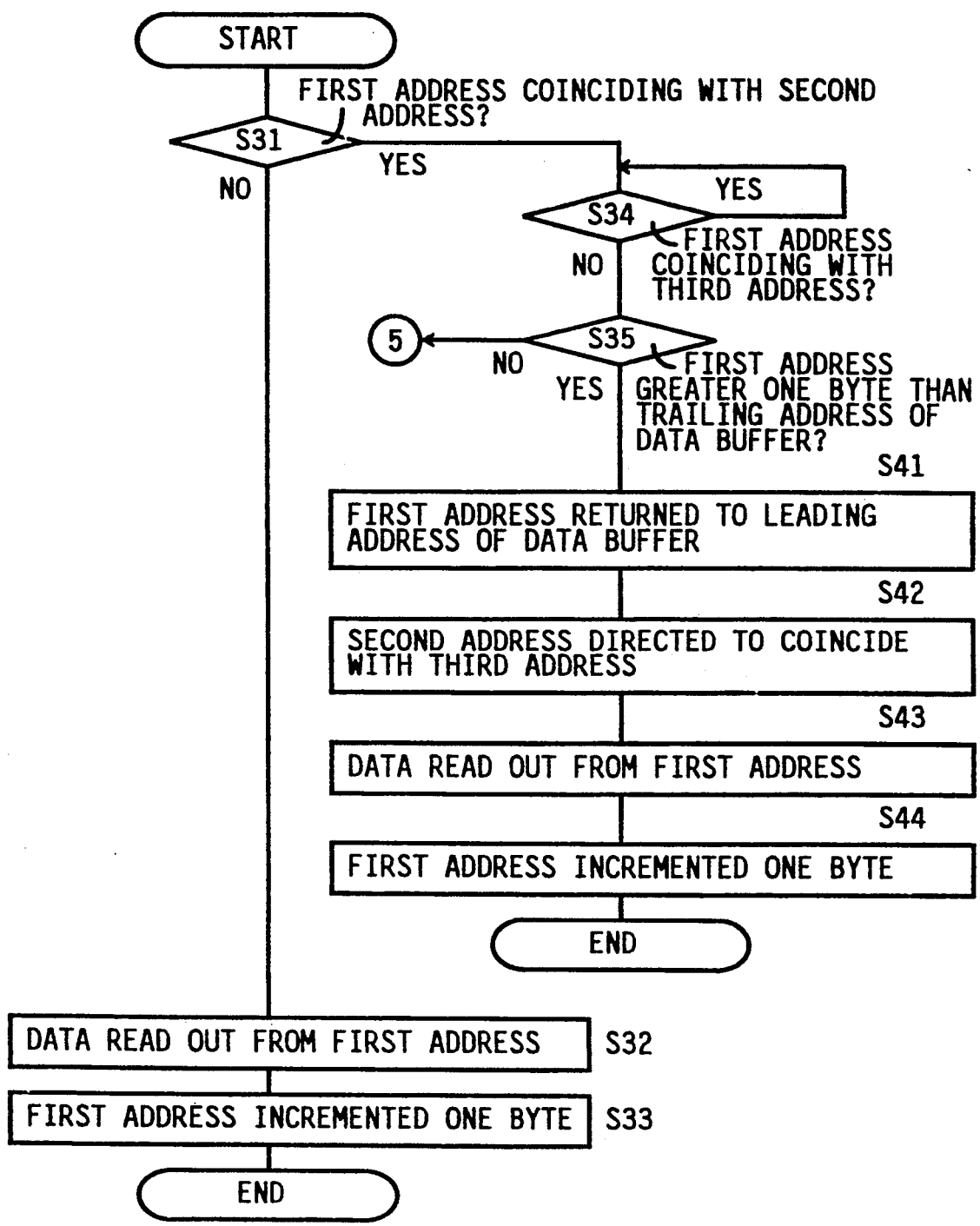

Referring first to FIG. 1 there is shown an electric control section of a laser printer which serves as a data buffering device. The electric control section includes an interface (I/F) 10 through which the printer is connected to an external print data supply (not shown), for example, a word processor or a personal computer. The interface 10 is coupled to a process center 12 via data bus/address bus 14 and an interrupt signal line 16. The process center 12 includes a read only memory (ROM) storing control programs, and a central processing unit (CPU) implementing the control programs. The control programs include the programs related to data storage and data reading, which programs are shown in FIGS. 2-4. The process center 12 is coupled to a random access memory (RAM) 18. The RAM 18 includes a work area 20, a data buffer 22, a page memory 24, and a print buffer 26. The RAM 18 further includes a first (DATA READING) address pointer 28, a second (SIMPLE DATA READING) address pointer 30, a third (DATA STORAGE) address pointer 32, and a fourth (SIMPLE DATA STORAGE) address pointer 34. Appropriate storage areas of the RAM 18 are allotted for each of the elements 20-34.

The work area 20 temporarily stores data produced by operation of the process center 12 (or the CPU thereof). The data buffer 22 consists of a predetermined number of storage areas, and stores plural sets of print data supplied from the external data supply via the interface 10. A set of print data includes (a) data such as vector data representative of a figure to be printed by the printer (the term "figure" should be interpreted in a wide sense as including characters), (b) data related to a position of print of the figure, and (c) data related to a magnification of print of the figure. The data buffer 22 permits plural sets of print data to be stored one set by one therein such that each set of print data is stored in a first storage area (hereinafter, referred to as "AREA A") as AREA A is advanced from one area to another over the predetermined number of storage areas of the buffer 22 in a predetermined sequence, and permits the stored sets of print data to be read out one set by one therefrom in the same sequence such that each set of print data out of the stored sets of print data is read out from a second storage area (hereinafter, referred to as "AREA B") as AREA B is advanced from one area to another over the storage areas in the same sequence. Each set of print data read out from the data buffer 22 is converted at the process center 12 into a set of dot data, which is stored in the page memory 24 or the print buffer 26. The print buffer 26 is capable of storing sets of data corresponding to one line to be printed by the printer. The present data buffering device normally operates such that, while one line is being printed by the printer, conversion of the print data corresponding to another (next) one line is carried out at the process center 12 and the converted data is directly supplied to the print buffer 26. However, in an unusual event that conversion of data needs a considerably long time, a specified batch of data is converted into dot data prior to commencement of printing and the converted data is stored in the page memory 24. The data stored in the page memory 24 is read out one line by one therefrom to be supplied to the print buffer 26, so that the printer performs printing according to the data in the print buffer 26.

The first address pointer 28 indicates a first address corresponding to AREA B, while the third address pointer 32 indicates a third address corresponding to AREA A. The second address pointer 30 indicates a second address greater by one than an address corresponding to a trailing storage area of a simple data reading permitting area which permits data reading therefrom without the need of execution of any additional procedure (hereinafter, this data reading is referred to as the "simple" data reading). Meanwhile, the fourth address pointer 34 indicates a fourth address greater by one than an address corresponding to a trailing storage area of a simple data storage permitting area which permits data storage therein without the need of execution of any additional procedure (hereinafter, this data storage is referred to as the "simple" data storage). The functions of the second and fourth address pointers 30, 34 will be described in detail, together with the description of data reading and data storage carried out by the present data buffering device, by reference to the flow charts of FIGS. 2-4.

Upon application of electric power to the laser printer, initialization is implemented, which includes execution of Step S1 of the flow chart FIG. 2 in which, as shown in FIG. 5, the first, second and third address pointers 28, 30, 32 are directed to indicate, as the first, second and third addresses, respectively, a leading address (in the present embodiment, address number 0000H) corresponding to a leading storage area of the data buffer 22 as seen in the above-described predetermined sequence. Meanwhile, the fourth address pointer 34 is directed to indicate as the fourth address an address smaller by 499 bytes than a trailing address (in the present embodiment, address number F000H) corresponding to a trailing storage area of the data buffer 22 as seen in the same sequence In other words, the fourth address indicates an address in the neighborhood of the trailing address of the data buffer 22.

When a set of print data is supplied from the external data supply to the data buffer 22, Step S2 of the flow chart of FIG. 3 is carried out, in which it is judged whether or not the third address indicated by the third address pointer 32 coincides with the fourth address indicated by the fourth address pointer 34. In this initial cycle, the third address corresponds to the leading address of the data buffer 22 while the fourth address corresponds to the address near the trailing address of the data buffer 22. Therefore the judgement in Step S2 is negative (NO), and accordingly, Step S3 is carried out, in which the supplied set of print data is stored in AREA A corresponding to the third address indicated by the third address pointer 32. Step S3 is followed by Step S4 in which the third address indicated is incremented by one byte (one address). In this data storage process no additional step S5-S25 is carried out. This is a simple data storage as previously described. Likewise, plural sets of print data are stored in the data buffer 22 such that, each time a set of print data is supplied to the data buffer 22, Step S2 is executed. So long as the judgement in Step S2 continues to be negative, each set of print data out of the supplied sets of print data is stored in the third address (AREA A) in Step S3 as the third address is incremented one byte by one in Step S4. Thus, while simple data storages are being carried out, plural sets of print data are stored in the data buffer 22 at a high rate or speed since no additional step S5-S25 occurs. In the meantime, the data buffer 22 is brought into, for example, a state shown in FIG. 6, in which the shadowed portion represents the addresses (storage areas) in which print data have been stored.

When a data reading is carried out by the process center 12, Step S31 of the flow chart of FIG. 4 is implemented, in which it is judged whether or not the first address indicated by the first address pointer 28 coincides with the second address indicated by the second address pointer 30. When the data buffer 20 is in the state shown in FIG. 6, the judgement in Step S31 is affirmative (YES). Accordingly, Step S34 is carried out, in which it is judged whether or not the first address coincides with the third address indicated by the third address pointer 32. If the judgement in Step S34 is affirmative, then it means that no data is stored in the data buffer 22. Thus, Step S34 is repeated until one or more sets of data are stored in the data buffer 22 and the third address becomes different from the first address. When the data buffer 22 is in the state shown in FIG. 6, the judgement in Step S34 is negative. Accordingly, Step S35 is implemented, in which it is judged whether or not the first address represents that AREA B is positioned at a trailing storage area of the data buffer 22 in the predetermined sequence, namely, whether or not the first address pointer 28 indicates as the first address an address greater by one byte than the trailing address of the data buffer 22. When the data buffer 22 is in the state of FIG. 6, the judgement in Step S35 is negative. Subsequently, Step S36 is carried out, in which it is judged whether or not the first address is smaller than the third address. When the data buffer 22 is in the state of FIG. 6, the judgement in Step S36 is affirmative. Accordingly, Step S37 is implemented, in which, as shown in FIG. 7, the second address pointer 30 is directed to indicate the second address such that the second address coincides with the third address. Step S37 is followed by Step S39 in which a set of print data is read out from the first address (AREA B). Step S39 is followed by Step S40 in which the first address is incremented by one byte (one address), namely, AREA B is advanced forward by one storage area in the predetermined sequence. Thus, the data buffer 22 is placed in, for example, a state shown in FIG. 8. Simultaneously with these data readings, data storages occur on the data buffer 22, so that the third address (AREA A) is incremented by some bytes.

Figure 8:
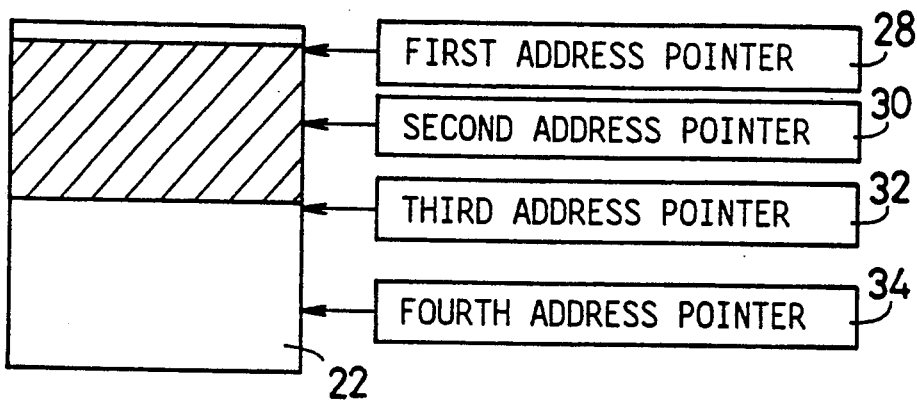
Figure 9:
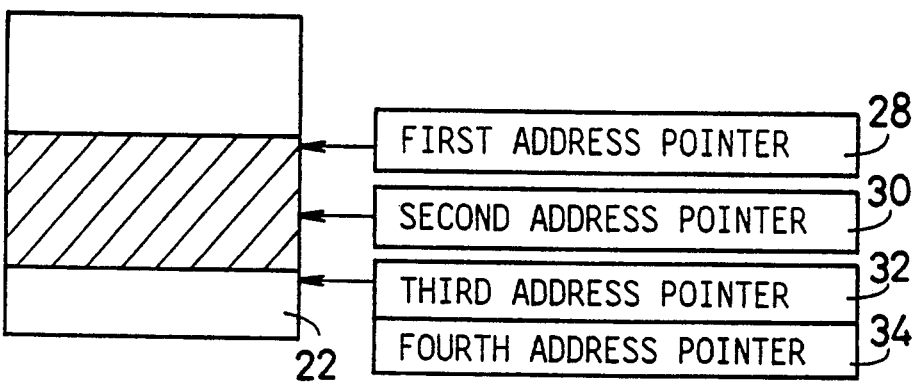

When the data buffer 22 is in the state of FIG. 8, the judgement in Step S31 in a new cycle is negative. Accordingly, Step S32 is implemented, in which a set of data is read out from the first address (AREA B), and Step S32 is followed by Step S33 in which the first address is incremented by one byte. In this data reading process no additional step S34-S44 occurs. This data reading is a simple data reading as previously described. Likewise, plural sets of data are read out from the data buffer 22 such that, each time a set of data is read out from the data buffer 22, Step S31 is executed. So long as the judgement in Step S31 continues to be negative, each set of print data out of the stored sets of print data is read out from the first address in Step S32 as the first address is incremented one byte by one in Step S33. Thus, while simple data readings are being carried out, plural sets of data are read out from the data buffer 22 at a high rate since no additional step S34-S44 occurs. In the meantime, after data storage and data reading are repeated, the data buffer 22 is brought into, for example, a state shown in FIG. 9, in which the third address (AREA A) indicated by the third address pointer 32 coincides with the fourth address indicated by the fourth address pointer 34. When the data buffer 22 is in the state of FIG. 9, the judgement in Step S2 is affirmative. Accordingly, Step S5 is carried out, in which it is judged whether or not the third address coincides with the first address indicated by the first address pointer 28. If the judgement in Step S5 is affirmative, then it means that the data buffer 22 has no storage area permitting data storage therein, namely, that the data buffer 22 is filled up with data. Accordingly, Step S6 is carried out, in which an error signal is generated. However, the present data buffering device is adapted to be free from the situation in which the judgement in Step S5 is affirmative, as described below. Accordingly, Step S5 is followed by Step S7 in which it is judged whether or not the third address represents that AREA A is positioned at the trailing storage area of the data buffer 22 in the predetermined sequence, namely, whether or not the third address pointer 32 indicates as the third address an address greater by one byte than the trailing address of the data buffer 22. When the data buffer 22 is in the state of FIG. 9, the judgement in Step S7 is negative. Subsequently, Step S9 is executed, in which it is judged whether or not the third address is greater than the first address. In the state of FIG. 9, the judgement in Step S9 is affirmative. Next, Step S10 is carried out, in which it is judged whether or not there are left more than 500 bytes between the third address and the trailing address of the data buffer 22. In the state of the buffer 22 shown in FIG. 9, the third address coincides with the fourth address indicated by the fourth address pointer 34, and the fourth address has been positioned since the time of initialization at the address smaller by 499 bytes than the trailing address of the data buffer 22. Therefore there are left just 500 bytes between the third address (AREA A) and the trailing address of the data buffer 22 inclusive. Accordingly, the judgement in Step S10 is negative. Subsequently, Step S11 is executed, in which it is judged whether or not there are left more than 500 bytes between the leading storage area of the data buffer 22 and the first address (AREA B). If the judgement in Step S11 is affirmative, then Step S12 is implemented, in which a set of data is stored in the third address, and Step S12 is followed by Step S13 in which the third address is incremented by one byte. Further Step S13 is followed by Step S14 in which the fourth address pointer 34 is directed to indicate as the forth address an address greater by one byte than the trailing address of the data buffer 22.

On the other hand, if the judgement in Step S11 is negative, then Steps S15 and S16 are carried out to store a set of data in the third address and increment the third address by one byte, respectively, and further Step S17 is carried out, in which the fourth address pointer 34 is directed to indicate the fourth address such that the fourth address coincides with the third address. Step S17 is followed by step S18 in which an interrupt signal is generated from the process center 12 to the external print data supply via the interrupt signal line 16 and the interface 10, so as to command a cease of data supply to the data buffer 22. Upon receipt of the interrupt signal the data supply ceases from supplying print data to the data buffer 22. However, in some events the data supply may not cease from supplying print data simultaneously with the receipt of the interrupt signal. In other words, sets of print data may be supplied from the data supply device to the data buffer 22 even after an interrupt signal is received by the data supply. In such events, however, Steps S2, S5, S7, S9, S10 and S11 are carried out so that in the following Step S15 each set of data out of the supplied sets of data is stored in the data buffer 22 without producing any problem. As previously described with respect to Steps S10 and S11, the present data buffering device is adapted such that normally there are left more than 500 bytes (addresses) between the third address (AREA A) and the tailing address of the data buffer 22 and that normally there are left more than 500 bytes between the leading address of the data buffer 22 and the first address (AREA B). Accordingly, even in the above-indicated events the additionally supplied sets of data can be stored in the data buffer 22 without any problem.

If in Step S18 an interrupt signal is generated, a control program (not shown) is carried out to wait until the data buffer 22 comes to have at least a predetermined number of storage area or areas which permits or permit data storage therein, and to thereafter generate another interrupt signal to the external data supply so as to allow data supply therefrom to the data buffer 22.

Figure 10:
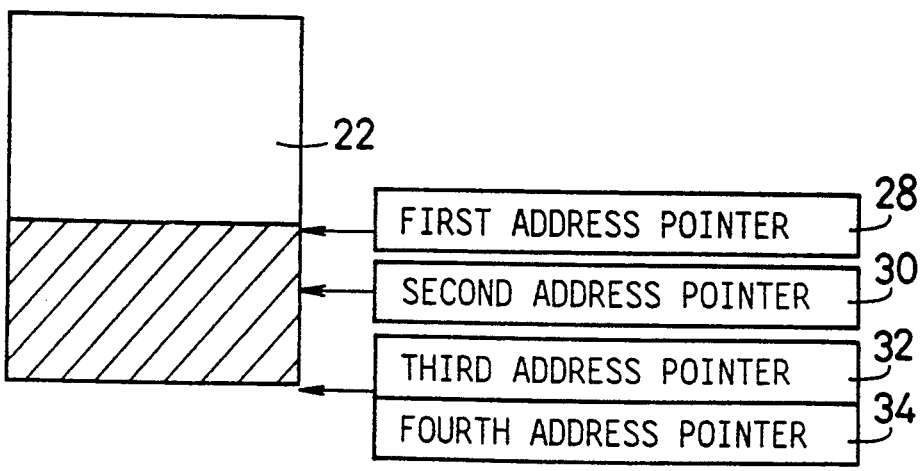

When the data buffer 22 is changed from the state of FIG. 9 to a state shown in FIG. 10 after data storage and data reading are repeated, the judgement in Step S2 is affirmative, the judgement in Step S5 is negative, and the judgement in Step S7 is affirmative. Accordingly, Step S8 is carried out, in which the third address pointer 32 is directed to indicate as the third address the leading address of the data buffer 22. In other words, the third address is returned from the address greater by one byte than the tailing address of the data buffer 22, to the leading address of the same. Accordingly, the judgement in the following Step S9 is negative. Subsequently, Step S19 is implemented, in which it is judged whether or not there are left more than 500 bytes between the third address (AREA A) and the first address (AREA B). If the judgement in Step S19 is negative, Steps S15–S18 are carried out as previously described. On the other hand, if the judgement in Step S19 is affirmative, Steps S20 and S21 are carried out to store a set of data in the third address and increment the third address by one byte, respectively. Step S21 is followed by Step S22 in which the fourth address pointer 34 is directed to indicate as the fourth address an address smaller by 499 bytes than the first address. This state of the data buffer 22 is shown in FIG. 11.

Figure 11:
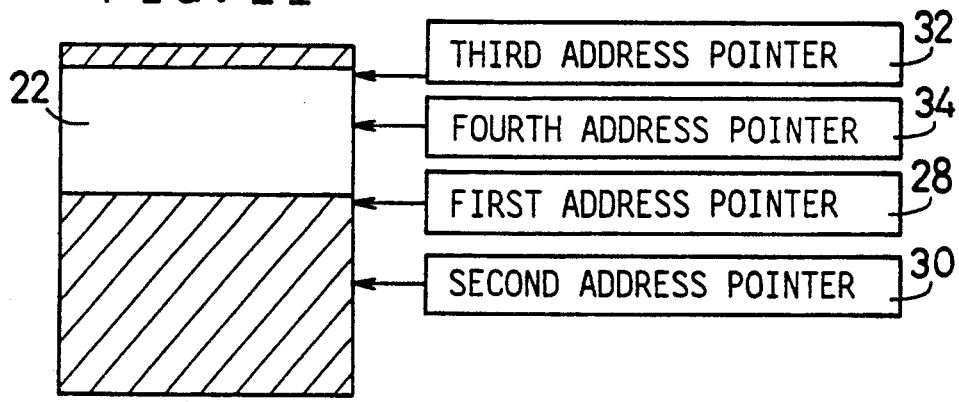
Figure 12:
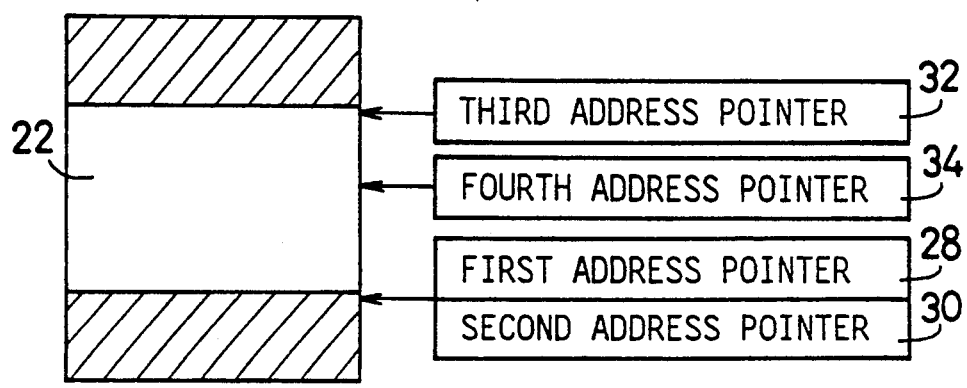
Figure 13:
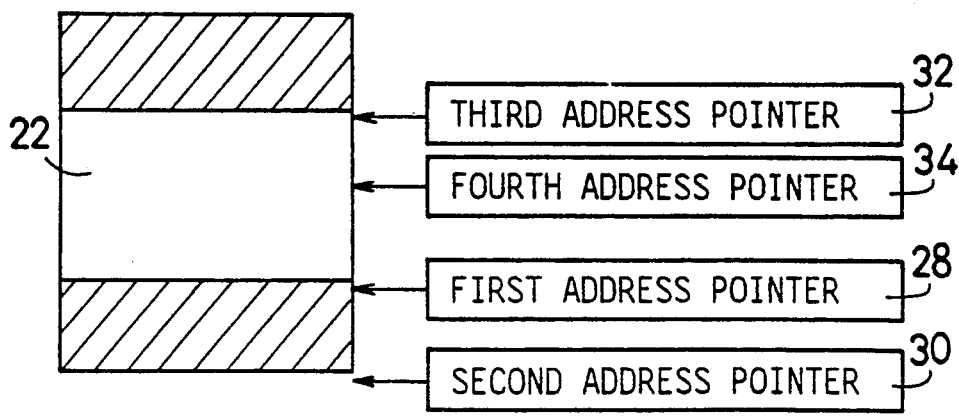

When further print data are stored in, and read out from, the data buffer 22, the data buffer 22 is changed from the state of FIG. 11 to, for example, a state shown in FIG. 12 in which the first address (AREA B) indicated by the first address pointer 28 coincides with the second address indicated by the second address pointer 30. In the state shown in FIG. 12, the judgement in Step S31 is affirmative, and all the judgements in Steps S34, S35, S36 are negative. Accordingly, Step S38 is carried out, in which as shown in FIG. 13 the second address pointer 30 is directed to indicate a the fourth address the address greater by one byte than the trailing address of the data buffer 22. Subsequently, Steps S39 and S40 are executed to read out a set of data from the first address (AREA B) and increment the first address by one byte.

Figure 14:
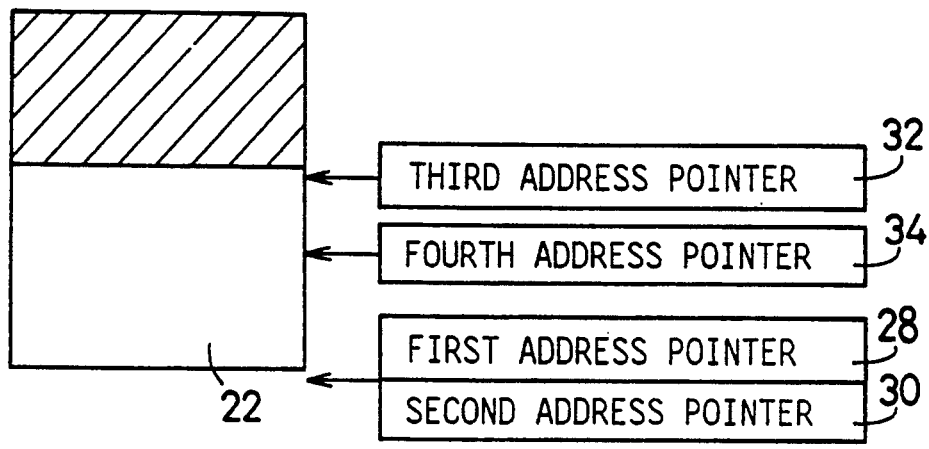
Figure 15:
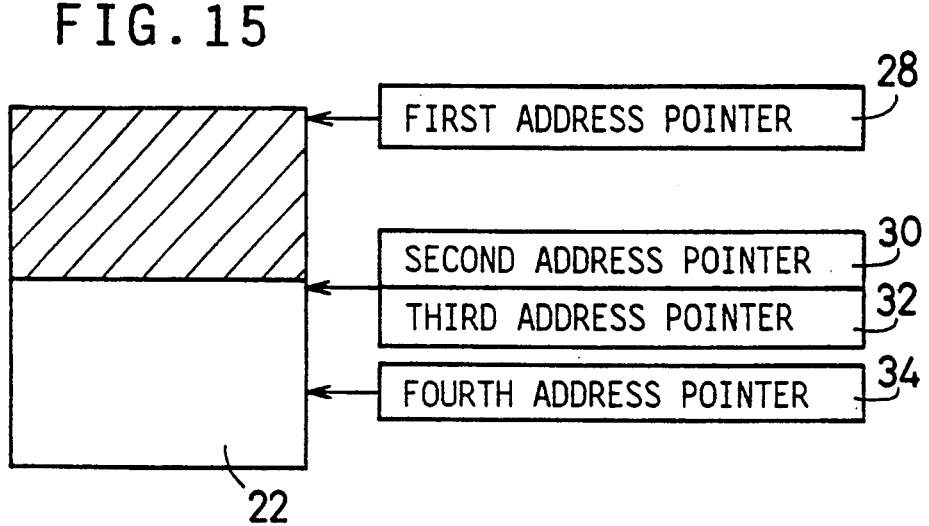

Further data storage and data reading are carried out, and the data buffer 22 is placed in, for example, a state shown in FIG. 14 in which the first address (AREA B) coincides with the second address currently indicating the address greater by one byte than the trailing address of the data buffer 22. In this state of the data buffer 22, the judgement in Step S31 is affirmative, the judgement in Step S34 is negative, and the judgement in Step S35 is affirmative. Accordingly, Step S41 is carried out, in which as shown in FIG. 15 the first address pointer 28 is directed to indicate as the first address the leading address of the data buffer 22. In other words, the first address is returned from the address greater by one byte than the trailing address of the data buffer 22 to the leading address of the same. Step S41 is followed by Step S42 in which the second address pointer 30 is directed to indicate the second address such that the second address coincides with the third address indicated by the third address pointer 32. Step S42 is followed by Steps S43 and S44 to read out a set of data from the first address (AREA A) and increment the first address by byte.

Print data are further stored in, and read out from, the data buffer 22 from the state of FIG. 15 and, in the meantime, the third address (AREA A) may coincide with the fourth address indicated by the fourth address pointer 34, like in the state of FIG. 9. In this state of the data buffer 22, Steps S2, S5, S7 and S9 are carried out, and the judgement in Step S9 is affirmative. Accordingly, Step S10 is carried out. If the judgement in Step S10 is negative, Steps S11–S14 are carried out as previously described with respect to FIG. 9. On the other hand, if the judgement in Step S10 is affirmative, Steps S23 and S24 are carried out to store a set of print data in the third address (AREA A) and increment the third address by one byte. Step S24 is followed by Step S25 in which the fourth address pointer 34 is directed to indicate a the fourth address an address smaller by 499 bytes than the trailing address of the data buffer 22.

Each time a set of print data is supplied to the data buffer 22, or each time a set of print data is read out form the data buffer 22, an appropriate one of the above described various routes is selected and followed.

As is apparent from the foregoing description, the present data buffering device is capable of carrying out "simple" data storages each through the simple data storage cycle of Steps S2, S3 and S4 so long as Step S2 continue to provide negative judgements, namely, before the third address (AREA A) indicated by the third (DATA STORAGE) address pointer 32 coincides with the fourth address indicated by the fourth (SIMPLE DATA STORAGE) address pointer 34. Only in the event that the third address coincides with the fourth address, the additional, judgements-executing data storage cycle of Steps S5–S25, including judgement steps S7, S10, S11, S19, are carried out. More specifically, Step S7 serves as return judgement means for, if the judgement in Step S2 is affirmative, executing a return judgement whether or not it is necessary to return the third address (AREA A) to the leading address (storage area) of the data buffer 22, while Steps S19, S10 and S11 serve as possibility judgement means for, if the judgement in Step S2 is affirmative, executing a possibility judgement whether or not the data buffer 22 has at least a predetermined number of storage area or areas permitting storage therein of one or more sets of data. If a result of the return judgement is affirmative, Step S8 is carried out to return the third address to the leading address of the data buffer 22, namely, direct the third address pointer 32 to indicate as the third address the leading address of the data buffer 22. If a result of the possibility judgement is affirmative, Step S22, S25 or S14 is carried out. In Step S22 the fourth address pointer 34 is directed to indicate as the fourth address an address greater by one byte than an address which is smaller by the "number" of the above-indicated predetermined number of storage areas than the first address. In Step S25 the fourth address pointer 34 is directed to indicate as the fourth address an address greater by one byte than an address which is smaller by the above "number" than the trailing address of the data buffer 22. In Step S14 the fourth address pointer 34 is directed to indicate as the fourth address an address greater by one bite than the trailing address of the data buffer 22. As a result of execution of Step S22, S25 or S19 with or without the need of execution of Step S8, the third and fourth address pointers 32, 34 are placed in a state in which, when a set of print data is supplied to the data buffer 22, Step S2 provides a negative judgement, that is, a simple data storage is permitted.

Thus, portions of the process center 12 and the work area 20 which portions are adapted to implement Step S2, and the third (DATA STORAGE) and fourth (SIMPLE DATA STORAGE) address pointers 32, 34, cooperate with each other to serve as simple data storage judgement means for judging whether or not it is permissible to carry out a simple data storage in the data buffer 22. Portions of the process center 12 and the work area 20 which portions are adapted to implement Steps S5–S25 serve as judgements-executing data storage means for, if the judgement of the simple data storage judging means is negative, executing a return judgement whether or not it is necessary to return the first storage area (AREA A) to the leading storage area of the data buffer 22 in the predetermined sequence, and a possibility judgement whether or not the data buffer 22 has at least a predetermined number of storage area or areas permitting data storage therein. Meanwhile, portions of the process center 12 and the work area 20 which portions are adapted to implement Steps S3 and S4 serve as simple data storage means for, if the judgement of the simple data storage judgement means is affirmative, carrying out a simple data storage in the data buffer, without execution of the above-indicated return or possibility judgement of the judgements-executing data storage means.

The present data buffering device is also capable of carrying out "simple" data readings each through the simple data reading cycle of Steps S31, S32 and S33 so long as Step S31 continues to provide negative judgements, namely, before the first address indicated by the first (DATA READING) address pointer 28 coincides with the second address indicated by the second (SIMPLE DATA READING) address pointer 30. Only in the event that the first address coincides with the second address, the additional, judgements-executing data reading cycle of Steps S34–S44, including judgement steps S34, S35, are carried out. More specifically, Step S35 serves as return judgement means for, if the judgement in Step S31 is affirmative, executing a return judgement whether or not it is necessary to return the first address (AREA B) to the leading address (storage area) of the data buffer 22, while Step S34 serves as possibility judgement means for, if the judgement in Step S2 is affirmative, executing a possibility judgement whether or not the data buffer 22 has at least a predetermined number of storage area or areas permitting reading out therefrom of one or more sets of data. If a result of the return judgement is affirmative, Step S41 is carried out to return the first address to the leading address of the data buffer 22, namely, direct the first address pointer 28 to indicate as the first address the leading address of the data buffer 22. If a result of the possibility judgement is affirmative, Step S37, S42 or S38 is carried out. In Step S37 or S42, the second address pointer 30 is directed to indicate the second address such that the the second address coincides with the third address indicated by the third (DATA STORAGE) address pointer 32. Meanwhile, in Step S38 the second address pointer 30 is directed to indicate as the second address the address greater by one byte than the trailing address of the data buffer 22. As a result of execution of Step S37, S42 or S38 with or without the need of execution of Step S41, the first and second address pointers 28, 30 are placed in a state in which, when a set of print data is read out from the data buffer 22, Step S31 provides a negative judgement and a simple data reading is permitted.

Thus, portions of the process center 12 and the work area 20 which portions are adapted to implement Step S31, and the first (DATA READING) and second (SIMPLE DATA READING) address pointers 28, 30 cooperate with each other to serve as simple data reading judgement means for judging whether or not it is permissible to carry out a simple data reading from the data buffer 22. Portions of the process center 12 and the work area 20 which portions are adapted to implement Steps S34–S44 serve as judgements-executing data reading means for, if the judgement of the simple data reading judgement means is negative, executing a return judgement whether or not it is necessary to return the second storage area (AREA B) to the leading storage area of the data buffer 22 in the predetermined sequence, and a possibility judgement whether o not the data buffer 22 has at least a predetermined number of storage area or areas permitting data reading therefrom. Meanwhile, portions of the process center 12 and the work area 20 which portions are adapted to implement Steps S32 and S33 serve as simple data reading means for, if the judgement of the simple data reading judgement means is affirmative, carrying out a simple data reading from the data buffer 22, without the need of execution of the above-indicated return or possibility judgement.

As emerges from the foregoing, in the present embodiment the simple data storage judgement means and the simple data reading judgement means cooperate with each other to serve as first means for judging whether or not it is permissible to carry out at least one of a simple data storage in the data buffer 22 and a simple data reading from the data buffer 22. The judgements-executing data storage means and the judgements-executing data reading means cooperate with each other to serve as second means for, if the judgement of the first means is negative, executing a return judgement whether or not it is necessary to return a corresponding one, or each, of the first and second storage areas to a leading storage area of the data buffer 22 in the predetermined sequence, and a possibility judgement whether or not the data buffer 22 has at least a predetermined number of storage area or areas permitting a corresponding one, or each, of a data storage and a data reading. Meanwhile, the simple data storage means and the simple data reading means cooperate with each other as third means for, if the judgement of the first means is affirmative, carrying out at least one of the simple data storage in the data buffer 22 and the simple data reading from the data buffer 22, without the need of execution of the return or possibility judgement of the second means.

In the present embodiment, the second (SIMPLE DATA READING) address pointer 30 serves as indicator means for indicating, based on the second address indicated thereby, whether or not a simple data reading from the data buffer 22 is permissible, while the fourth (SIMPLE DATA STORAGE) address pointer 34 serves as indicator means for indicating, based on the fourth address indicated thereby, whether or not a simple data storage in the data buffer 22 is permissible. While simple data readings or storages continue on the data buffer 22, it is unnecessary to increment the second or fourth address indicated by the second or fourth address pointer 30, 34, respectively. Thus, the simple data readings or storages are carried out without execution of any additional step and hence at raised speed. However, the second and fourth address pointers 30, 34 may be replaced by a first (SIMPLE DATA READING) memory indicating an amount (or number) of the storage area or areas permitting simple data reading therefrom and a second (SIMPLE DATA STORAGE) memory indicating an amount (or number) of the storage area or areas permitting simple data storage therein, respectively. In this case, the first means is adapted to judge whether or not the number indicated by the first or second memory is greater than a reference value, and based on the result of this judgement further judges whether or not simple data reading or storage is permissible. This modified embodiment will be described below in more detail by reference to FIGS. 16–18.

Figure 16:
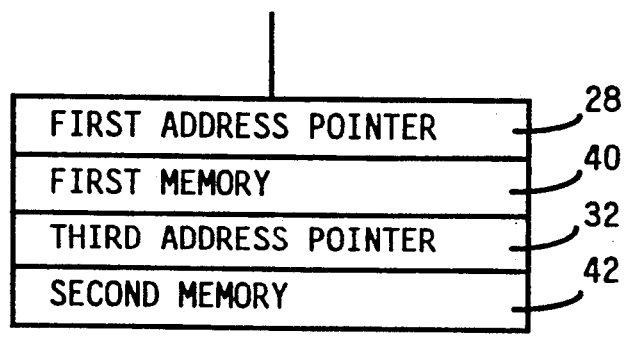
FIG. 16 is a view of a portion of another embodiment of the data buffering device of the present invention.
Figure 17:
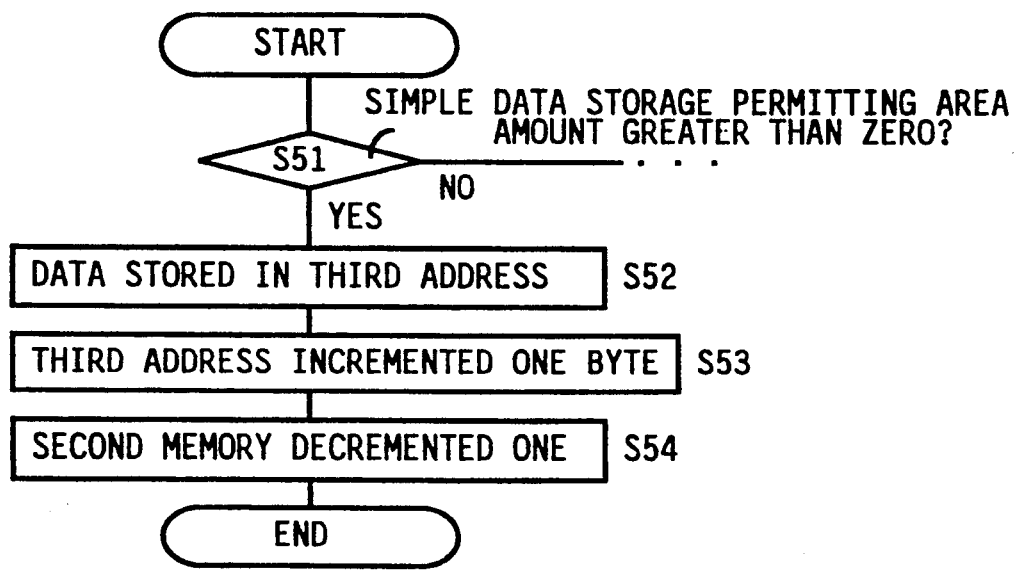
FIGS. 17 and 18 are flow charts representing control programs related to data storage and data reading carried out by the data buffering device of FIG. 16.
Figure 18:
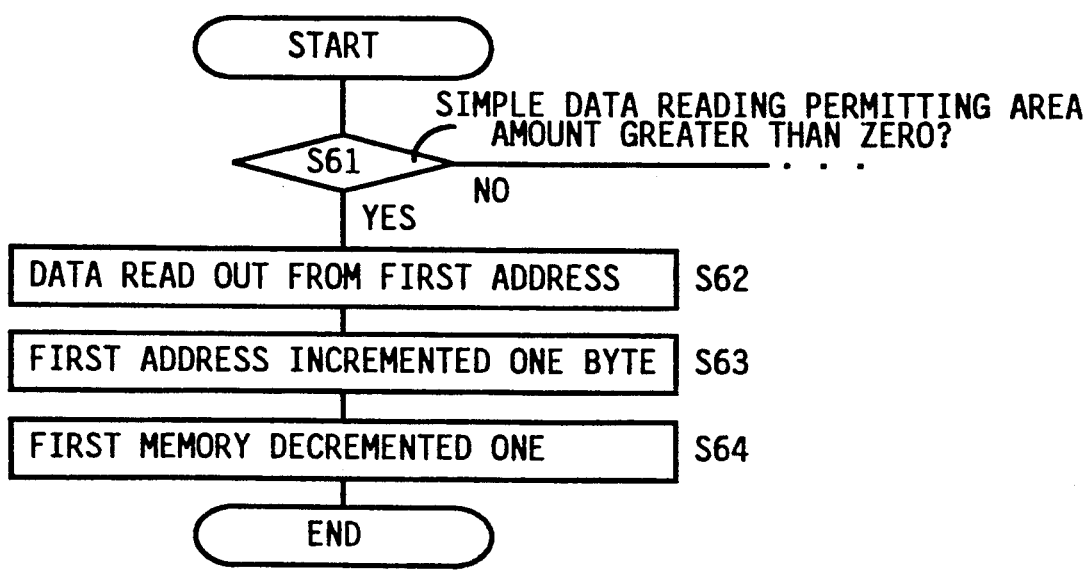

In FIG. 16, the RAM 18 has the first and second memories 40, 42 in place of the second and fourth address pointers 30, 34, respectively. Data storage is carried out according to the modified flow chart of FIG. 17, while data reading is carried out according to the modified flow chart of FIG. 18. FIG. 17 shows only the simple data storage cycle consisting of Steps S51–S54. In Step S51 it is judged whether or not the number indicated by the second memory 42 is greater than zero, in Step S52 a set of print data is stored in the third address (AREA A) indicated by the third address pointer 32, in Step S53 the third address is incremented by one byte (one address), and in Step S54 the content (or amount) of the second memory 42 is decremented by one. The additional, judgements-executing data storage cycle for the instant embodiment is almost similar to that for the preceding embodiment shown in FIGS. 1–15, and accordingly the second memory 42 is appropriately directed to indicate the number of the storage areas permitting simple data storage therein, and is decremented by one each time a set of print data is read out from the data buffer 22. Data reading is carried out according to the flow chart of FIG. 18 and the additional, judgements-executing data reading cycle, like the data storage operation.

It is noted that, while in the illustrated two embodiments the principle of the present invention is applied to both data storage and data reading, it is however possible to apply the same to one of data storage and data reading.

While the present invention has been described in detail with reference to the presently preferred embodiments thereof, it is to be understood that the present invention is not limited to the details of the illustrated embodiments but may be embodied with various changes, modifications and improvements that may occur to those skilled in the art without departing from the scope and spirit of the invention as defined in the appended claims.

What is claimed is:

1. A data buffering device comprising:
   a data buffer including a plurality of storage areas, each one of the plurality of storage areas capable of storing one of a plurality of data sets, the plurality of storage areas comprising a leading storage area, a trailing storage area and a predetermined sequence of intermediate storage areas between the leading and trailing storage areas;
   a storage area point for pointing to one of the plurality of storage areas as a current storage area such that, after writing one of the plurality of data sets into the current storage area, the storage area pointer is advanced to point to a following one of the plurality of storage areas as a next storage area, the next storage area following the current storage area in the predetermined sequence;
   a current output area pointer for pointing to a first one of a plurality of filled storage areas as a current output area, each one of the plurality of filled storage areas having one of the plurality of data sets stored herein, such that, after reading one of the plurality of stored data sets from the current output area, the current output area pointer is advanced to point to a following one of the plurality of filled storage areas as a next output area, the next output area following the current output area in the predetermined sequence;
   a last output area pointer for pointing to a second one of the plurality of filled storage areas as a last output area;
   first buffer-state-judging means for determining whether the data buffer is in a first state wherein a current relationship between the current output area and the trailing storage area coincides with a predetermined relationship between the current output area and the trailing storage area, thereby indicating a need to change the current output area pointer to point to the leading storage area as the current output area of the data buffer;
   second buffer-state-judging means for determining whether the data buffer is in a second state wherein the current output area is greater than a first predetermined number of the plurality of storage areas from the current storage area;
   third buffer-state-judging means for determining whether the data buffer is in a third state wherein the current output area is greater than a second predetermined number of the plurality of storage areas from the last output area, wherein the second predetermined number is not greater than the first predetermined number;
   first data-buffering means for performing a simple data reading in response to a positive determination by the third buffer-state-judging means and without operating the first and second buffer-state-judging means, the simple data reading comprising (i) a data output operation and (ii) a current output area advancing operation; and
   second data-buffering means for carrying out a complex data reading by operating the first and second buffer-state-judging means in response to a negative determination by the third buffer-state-judging means so that in response to at least one of a positive determination by the first buffer-state-judging means and a positive determination by the second buffer-state-judging means, the complex data reading comprises at least one of repositioning the current output area pointer to the leading storage area and repositioning the last output area pointer to a filled one of the plurality of storage areas spaced at least the first predetermined number from the current storage area, to place the data buffer into the third state prior to carrying out the simple data reading, and so that in response to a negative determination by the second buffer-state-judging means, the second data-buffering means prevents carrying out the simple data reading until the data buffer is placed into the second state.

2. The data buffering device of claim 1, wherein:

the plurality of storage areas of the data buffer are each associated with one of a plurality of addresses ordered in the predetermined sequence;

the current output area pointer comprises a first address pointer indicating one of the plurality of addresses corresponding to the current output area as a first pointer address; and the last output area pointer comprises a second address pointer indicating one of the plurality of addresses corresponding to the last output area as a second pointer address, the first and second address pointers defining a simple data reading portion of the plurality of storage areas between and inclusive of the storage areas corresponding to the first to the second pointer addresses in the predetermined sequence; and the third buffer-state-judging means comprising a first pointer-address-judging means for judging whether the first pointer address is greater than the first predetermined number from the second pointer address, a positive judgement of the first pointer-address-judging means indicating that the simple data reading portion currently contains a sufficient number of filled storage areas, the third buffer-state-judging means providing a positive judgement indicating that the data buffer currently is in the third state when the first pointer-address-judging means provides the positive judgement, thereby allowing the first data-buffering means to perform the simple data reading.

3. The data buffering device of claim 2, wherein:

the first buffer-state-judging means comprises first return-judgement means for judging whether the data buffer is in the first state, wherein the first address pointer indicates a predetermined address as the first pointer address; and the second data-buffering means comprises first returning means for changing the first address pointer to indicate a leading address corresponding to the leading storage area as the first pointer address when a judgement of the first return-judgement means is positive.

4. A data buffering device comprising:

a data buffer including a plurality of storage areas, each one of the plurality of storage areas capable of storing one of a plurality of data sets, the plurality of storage areas comprising a leading storage area, a trailing storage area and a predetermined sequence of intermediate storage areas between the leading and trailing storage areas;

a current storage area pointer for pointing to one of the plurality of storage areas as a current storage area such that, after writing one of the plurality of data sets into the current storage area, the current storage area pointer is advanced to point to a following one of the plurality of storage areas as a next storage area, the next storage area following the current storage are in the predetermined sequence;

a last storage area pointer for pointing to a second one of the plurality of empty storage areas as a last storage area;

an output area pointer for pointing to a first one of a plurality of filled storage areas as a current output area, each one of the plurality of filled storage areas having one of the plurality of data sets stored therein, such that, after reading one of the plurality of stored data sets from the current output area, the output area pointer is advanced to point to a following one of the plurality of filled storage areas as a next output area, the next output area following the current output area in the predetermined sequence;

first buffer-state-judging means for determining whether the data buffer is in a first state wherein a current relationship between the current storage area and the trailing storage area coincides with a predetermined relationship between the current storage area and the trailing storage area, thereby indicating a need to change the current storage area pointer to point to the leading storage area as the current storage area of the data buffer;

second buffer-state-judging means for determining whether the data buffer is in a second state wherein the current storage area is greater than a first predetermined number of the plurality of storage means from the current output area;

third buffer-state-judging means for determining whether the data buffer is in a third state wherein the current storage area is greater than a second predetermined number of the plurality of storage areas from the last storage area, wherein the second predetermined number is not greater than the first predetermined number;

first data-buffering means for carrying out a simple data writing in response to a positive determination by the third buffer-state-judging means, the simple data writing comprising (i) a data storage operation of data into the current storage area without operating the first and second buffer-state-judging means and (ii) a current storage area advancing operation; and second data-buffering means for carrying out a complex data writing by operating the first and second buffer-state-judging means in response to a negative determination by the third buffer-state-judging means so that in response to at least one of a positive determination by the first buffer-state-judging means and a positive determination by the second buffer-state-judging means, the complex data writing comprises at least one of repositioning the current storage area pointer to the leading storage area and repositioning the last storage area pointer to an empty one of the plurality of storage areas spaced at least the first predetermined number from the current output area, to place the data buffer into the third state prior to carrying out the simple data writing, and so that in response to a negative determination by the second buffer-state-judging means, the second data-buffering means prevents carrying out the simple data writing until the data buffer is placed into the second state.

5. The data buffering device of claim 4, wherein:

the plurality of storage areas of the data buffer are each associated with one of a plurality of addresses ordered in the predetermined sequence;

the current storage area pointer comprises a first address pointer indicating an address corresponding to the current storage area as a first pointer address; and the last storage area pointer comprises a second address pointer indicating an address corresponding to the last output area as a second pointer address, the first and second address pointers defining a simple data storing portion of the plurality of storage areas between and inclusive of the storage areas corresponding to the first and second address pointers in the predetermined sequence; and the third buffer-state-judging means comprising first pointer-address-judging means for judging whether the first pointer address is greater than the first predetermined number from the second pointer address, a positive judgement of the first pointer-address-judging means indicating that the simple data storing portion currently contains a sufficient number of empty storage areas, the third buffer-state judging means providing, a positive judgement indicating that the data buffer currently is in the third state when the first pointer-address-judging means provides the positive judgement, thereby allowing the first data-buffering means to perform the simple data storing.

6. The data buffering device of claim 5, wherein:

the first buffer-state-judging means comprises first return-judgement means for judging whether the data buffer is in the first state, wherein the first address pointer indicates a predetermined address as the first pointer address; and the second data-buffering means comprises first returning means for changing the first address pointer to indicate a leading address corresponding to the leading storage area as the first pointer address when a judgement of the first return-judgement means is positive.

7. A data buffering device comprising:

a data buffer including a plurality of storage areas, each one of the plurality of storage areas capable of storing one of a plurality of data sets, the plurality of storage areas comprising a leading storage area, a trailing storage area and a predetermined sequence of intermediate storage areas between the leading and trailing storage areas;

a current storage area pointer for pointing to one of the plurality of storage areas as a current storage area such that, after writing one of the plurality of data sets into the current storage area, the current storage area pointer is advanced to point to a following one of the plurality of storage areas as a next storage area, the next storage area following the current storage area in the predetermined sequence;

a last storage area pointer for pointing to a second one of the plurality of empty storage areas as a last storage area;

a current output area pointer for pointing to a first one of a plurality of filled storage areas as a current output area, each one of the plurality of filled storage areas having one of the plurality of data sets stored therein, such that, after reading one of the plurality of stored data sets from the current output area, the current output area pointer is advanced to point to a following one of the plurality of filled storage areas as a next output area, the next output area following the current output area in the predetermined sequence;

a last output area pointer for pointing to a second one of the plurality of filled storage areas as a last output area;

first buffer-state-judging means for determining whether the data buffer is in a first state wherein one of a) a current relationship between the current output area and the trailing storage area coincides with a predetermined relationship between the current output area and the trailing storage area, and b) a current relationship between the current storage area and the trailing storage area coincides with a predetermined relationship between the current storage area and the trailing storage area, thereby indicating a need to change one of a) the current output area pointer to point to the leading storage area as the current output area and b) the current storage area pointer to point to the leading storage area as the current storage area; p1 second buffer-state-judging means for determining whether the data buffer is in a second state wherein one of a) the current output area is greater than a first predetermined number of the plurality of storage areas from the current storage area and b) the current storage area is greater than a second predetermined number of the plurality of storage areas from the current output area;

third buffer-state-judging means for determining whether the data buffer is in a third state wherein one of a) the current output data is greater than a third predetermined number of the plurality of storage areas from the last output area, the third predetermined number being not greater than the first predetermined number and b) the current storage area is greater than a fourth predetermined number of the plurality of storage areas from the last storage area, the fourth predetermined number being not greater than the second predetermined number;

first data-buffering means for carrying out one of a simple data reading and a simple data writing in response to a positive determination by the third buffer-state-judging means, the simple data reading comprising i) a data output operation and ii) a current output area advancing operation without operating the first and second buffer-state-judging means and the simple data writing comprising i) a data storage operation and ii) a current storage area advancing operation without operating the first and second buffer-state-judging means; and second data-buffering means for carrying out one of a complex data reading and a complex data writing by operating the first and second buffer-state-judging means in response to a negative determination by the third buffer-state-judging means so that in response to at least one of a positive determination by the first buffer-state-judging means and a positive determination by the second buffer-state-judging means, the complex data reading comprising at least one of repositioning the current output area pointer to the leading storage area and repositioning the last output area pointer to a filled one of the plurality of storage areas and the complex data writing comprising at least one of repositioning the current storage area pointer to the leading storage area and repositioning the last storage area pointer to an empty one of the plurality of storage areas, to place the data buffer into the third state prior to carrying out a corresponding one of the simple data reading and simple data writing, and so that in response to a negative determination by the second buffer-state-judging means, the second data-buffering means carrying out one of the simple data reading and the simple data writing until the data buffer is placed into the second state.

8. The data buffering device of claim 7, wherein:

the plurality of storage areas of the data buffer are each associated with one of a plurality of addresses ordered in the predetermined sequence;

the current output area pointer comprises a first address pointer indicating an address corresponding to the current output area as as a first pointer address;

the last output pointer comprises a second address pointer indicating an address corresponding to the last output area as a second pointer address, the first and second address pointers defining a simple data reading portion of the plurality of storage areas between and inclusive of the storage areas corresponding to the first and second address pointers in the predetermined sequence;

the third buffer-state-judging means comprises first pointer-address-judging means for judging whether the first pointer address is greater than the third predetermined number from the second pointer address, a positive judgement of the first pointer-address-judging means indicating that the simple data reading portion currently contains a sufficient number of filled storage areas, the third buffer-state-judging means providing, a positive judgement indicating that the data buffer currently is in the third state, thereby allowing the first data buffering-means to perform the simple data reading;

the current storage area pointer comprises a third address pointer indicating an address corresponding to the current storage area as a third pointer address; and the last storage area pointer comprises a fourth address pointer indicating an address corresponding to the last storage area as a fourth pointer address and the third buffer-state-judging means further comprises second pointer-address-judging means for judging whether the third pointer address is greater than the fourth predetermined number from the fourth pointer address, a positive judgement of the second pointer-address-judging means indicating that the simple data storing portion currently contains a sufficient number of empty storage area, the third buffer-state-judging means providing, a positive judgement indicating that the data buffer currently is in the third state, thereby allowing the first data-buffering means to perform the simple data storing.

9. The data buffering device of claim 8, wherein said second data buffering means comprises:

first address-pointer-repositioning means for repositioning the fourth address pointer to indicate an address at least the second predetermined number of storage areas behind the first pointer address in the predetermined sequence;

data storage inhibition judging means for judging whether said data buffer currently has more than the second predetermined number of storage areas between and inclusive of the storage areas corresponding to the third and first pointer addresses in the predetermined sequence; and data storage inhibiting means for generating a signal to inhibit a data supply to said data buffer when a judgement of the data storage inhibition judging means is negative.

10. The data buffering device of claim 8, wherein:

the first buffer-state-judging means comprises first return-judgement means for judging whether the data buffer is in the first state, wherein the first address pointer indicates a predetermined address as the first pointer address; and the second data-buffering means comprises a first returning means for changing the first address pointer to indicate a leading address corresponding to the leading storage area as the first pointer address when a judgement of the first return judgement means is positive, and first address pointer repositioning means for repositioning said second address pointer to indicate the third pointer address as the second pointer address.

11. The data buffering device of claim 8, wherein:

the first buffer-state-judging means comprises first return judgement means for judging whether the data buffer is in the first state, wherein the first address pointer indicates a predetermined address as the first pointer address; and the second data-buffering means comprises a first returning means for changing the first address pointer to indicate a leading address corresponding to the leading storage area as the first pointer-address in response to a positive judgment of the first return judgement means, location judging means for determining whether the first pointer address is greater than said third pointer address, and first repositioning means for repositioning the second address pointer to indicate the third pointer address as the second pointer address in response to a negative judgement by the first return judgement means and a negative judgement by the location judging means and for repositioning the second address pointer to indicate the predetermined address in response to a negative judgement by the first return judgement means and a positive judgement by the location determining means.

12. The data buffering device of claim 8, wherein the second data-buffering means comprises:

third pointer-address-judging means for judging whether the third pointer address is smaller than the said first pointer address;

data storage inhibition judging means for judging whether said data buffer currently has more than the second predetermined number of storage means between the storage areas corresponding to the third pointer address and the first pointer address in the predetermined sequence; and first inhibiting means for generating a signal to inhibit a data supply to said data buffer in response to a positive judgement by the second pointer-address-judging means, a positive judgement by the third pointer-address-judging means, and a negative judgement by the data storage inhibiting means.

13. The data buffering device of claim 8, wherein the second data-buffering means comprises:

third pointer-address-judging means for judging whether the third pointer address is greater than the first pointer address;

fourth pointer-address-judging means for judging whether said data buffer currently has more than the second predetermined number of storage areas between the storage areas corresponding to the third pointer address and the predetermined address in the predetermined sequence;

fifth pointer-address-judging means for judging whether said data buffer currently has more than the second predetermined number of storage areas between the storage areas corresponding to the third pointer address and the first pointer address in the predetermined sequence; and first changing means for repositioning the fourth address pointer to indicate an address preceding the predetermined address in the predetermined sequence by a fifth predetermined number in response to a negative judgement by the second pointer-address-judging means and positive judgements by the third pointer-address-judging means and the fourth pointer-address-judging means, and repositioning the fourth address pointer to indicate an address preceding the predetermined address in the predetermined sequence by the fifth predetermined number in response to positive judgements by the second pointer-address-judging means and the fifth pointer-address-judging means and a negative judgement by the third pointer-address-judging mean.

14. The data buffering device of claim 13, wherein the second data-buffering means further comprises:

sixth pointer-address-judging means for judging whether said data buffer currently has more than the second predetermined number of storage areas between the storage areas corresponding to the leading address and the first pointer address in the predetermined sequence; and second changing means for changing the fourth address pointer to indicate the predetermined address as the fourth pointer address in response to negative judgements by the second pointer-address-judging means and the fourth pointer-address-judging means and positive judgements by the third pointer-address-judging means and the sixth pointer-address-judging means.

15. The data buffering device of claim 14, wherein the second data-buffering means further comprises inhibiting means for repositioning the fourth address pointer to indicate the third pointer address as the fourth pointer address and for generating a signal to inhibit a data supply to the data buffer in response to negative judgements by the second pointer-address-judging means, the fourth pointer-address-judging mean sand the sixth pointer-address-judging means and a positive judgement by the third pointer-address-judging means.

16. A data buffering device comprising:

a data buffer including a plurality of storage areas, each one of the plurality of storage areas capable of storing one of a plurality of data sets, the plurality of storage areas comprising a leading storage area, a trailing storage area and a predetermined sequence of intermediate storage areas between the leading and trailing storage areas;

a current storage area pointer for pointing to one of the plurality of storage areas as a current storage area such that, after writing one of the plurality of data sets into the current storage area, the current storage area pointer is advanced to point to a following one of the plurality of storage areas as a next storage area, the next storage area following the current storage area in the predetermined sequence;

a current output area pointer for pointing to a first one of a plurality of filled storage areas as a current output area, each one of the plurality of filled storage areas having one of the plurality of data sets stored therein, such that, after reading one of the plurality of stored data sets from the current output area, the current output area pointer is advanced to point to a following one of the plurality of filled storage areas as a next output area, the next output area following the current output area in the predetermined sequence;

at least one of a last output area pointer for pointing to a second one of the plurality of filled storage areas as a last output area and a last storage area pointer for pointing to a second one of the plurality of empty storage areas as a last storage area;

first buffer-state-judging means for determining whether the data buffer is in a first state wherein at least one of a) a current relationship between the current output area and the trailing storage area coincides with a predetermined relationship between the current output area and the trailing storage area, and b) a current relationship between the current storage area and the trailing storage area coincides with a predetermined relationship between the current storage area and the trailing storage area, thereby indicating a corresponding need to change at least one of a) the current output area pointer to point to the leading storage area as the current output area of the data buffer and b) the current storage area pointer to point to the leading storage area as the current storage area of the data buffer;

second buffer-state-judging means for determining whether the data buffer is in a second state wherein at least one of a) the current output area is greater than a first predetermined number of the plurality of storage areas from the current storage area and b) the current storage area is greater than a second predetermined number of plurality of storage areas from the current output area;

third buffer-state-judging means for determining whether the data buffer is in a third state wherein at least one of a) the current output area is greater than a third predetermined number of the plurality of storage areas from the last output area, the third predetermined number being not greater than the first predetermined number and b) the current storage area is greater than a fourth predetermined number of the plurality of storage areas from the last storage area, the fourth predetermined number being not greater than the second predetermined number;

first data-buffering means for carrying out at least one of a) a simple data reading and b) a simple data writing in response to a positive determination by the third buffer-state-judging means, the simple data reading comprising i) a data output operation and ii) a current output area advancing operation, without operating the first and second buffer-state-judging means, and the simple data writing comprising i) a data storage operation and ii) a current storage area advancing operation, without operating the first and second buffer-state-judging means.

17. A data buffering device comprising:
a data buffer including a plurality of storage areas, each one of the plurality of storage areas capable of storing one of a plurality of data sets, the plurality of storage areas comprising a leading storage area, a trailing storage area and a predetermined sequence of intermediate storage areas between the leading and trailing storage areas;
a storage area pointer for pointing to one of the plurality of storage areas as a current storage area such that, after writing one of the plurality of data sets into the current storage area, the storage area pointer is advanced to point to a following one of the plurality of storage areas as a next storage area, the next storage area following the current storage area in the predetermined sequence;
a current output area pointer for pointing to a first one of a plurality of filled storage areas as a current output area, each one of the plurality of filled storage areas having one of the plurality of data sets stored therein, such that, after reading one of the plurality of stored data sets from the current output area, the current output area pointer is advanced to point to a following one of the plurality of filled storage areas as a next output area, the next output area following the current output area in the predetermined sequence;
first memory means for storing a difference number indicative of a number of filled storage areas;
first buffer-state-judging means for determining whether the data buffer is in a first state wherein a current relationship between the current output area and the trailing storage area coincides with a predetermined relationship between the current output area and the trailing storage area, thereby indicating a need to change the current output area pointer to point to the leading storage area as the current output area of the data buffer;
second buffer-state-judging means for determining whether the data buffer is in a second state wherein the current output area is greater than a first predetermined number of the plurality of storage areas from the current storage area;
third buffer-state-judging means for determining whether the data buffer is in a third state wherein the difference number stored in the first memory means is greater than a second predetermined number, the second predetermined number being not greater than the first predetermined number;
first data-buffering means for carrying out a simple data reading in response to a positive determination by the third buffer-state-judging means, the simple data reading comprising i) a data output operation, ii) a current output area advancing operation, and iii) decrementing the difference number without operating the first and second buffer-state-judging means; and
second data-buffering means for carrying out a complex data reading by operating the first and second buffer-state-judging means in response to a negative determination by the third buffer-state-judging means so that in response to at least one of a positive determination by the first buffer-state-judging means and a positive determination by the second buffer-state-judging means, the complex data reading comprises at least one of a) repositioning the current output area pointer to the leading storage area and b) resetting the difference number to indicate a current number of filled storage areas which is greater than the second predetermined number, to place the data buffer into the third state prior to carrying out the simple data reading, and so that in response to a negative determination by the second buffer-state-judging means, the second data-buffering means prevents carrying out the simple data reading until the data buffer is placed into the second state.

18. The data buffering device of claim 17, wherein the third buffer-state-judging means comprises first memory judging means for judging whether the difference number is greater than zero, the third buffer-state-judging means providing a positive judgement indicating that the data buffer currently is in the third state in response to a positive judgement by the first memory judging means, thereby allowing the first data-buffering means to carry out perform the simple data reading.

19. A data buffering device comprising:
a data buffer including a plurality of storage areas, each one of the plurality of storage areas capable of storing one of a plurality of data sets, the plurality of storage areas comprising a leading storage area, a trailing storage area and a predetermined sequence of intermediate storage areas between the leading and trailing storage areas;
a current storage area pointer for pointing to an empty one of the plurality of storage areas as a current storage area such that, after writing one of the plurality of data sets into the current storage area, the current storage area pointer is advanced to point to a following one of the plurality of storage areas as a next storage area, the next storage area following the current storage area in the predetermined sequence;
first memory means for storing a difference number indicative of a number of empty storage areas;
an output area pointer for pointing to a first one of a plurality of filled storage areas as a current output area, each one of the plurality of filled storage areas having one of the plurality of data sets stored therein, such that, after reading one of the plurality of stored data sets from the current output area, the output area pointer is advanced to point to a following one of the plurality of filled storage areas as a next output area, the next output area following the current output area in the predetermined sequence;
first buffer-state-judging means for determining whether the data buffer is in a first state wherein a current relationship between the current storage area and the trailing storage area coincides with a predetermined relationship between the current storage area and the trailing storage area, thereby indicating a need to change the current storage area pointer to point to the leading storage area as the current storage area of the data buffer;
second buffer-state-judging means for determining whether the data buffer is in a second state wherein the current storage area is greater than a first predetermined number of the plurality of storage areas from the current output area;
third buffer-state-judging means for determining whether the data buffer is in a third state wherein the difference number stored in the first memory means is greater than a second predetermined number, the second predetermined number being not greater than the first predetermined number;

first data-buffering means for carrying out a simple data writing in response to a positive determination by the third buffer-state-judging means, the simple data writing comprising i) a data storage operation, ii) a current storage area advancing operation, and iii) decrementing the difference number, without operating the first and second buffer-state-judging means; and second data-buffering means for carrying out a complex data writing by operating the first and second buffer-state-judging means in response to a negative determination by the third buffer-state-judging means so that in response to at least one of a positive determination by the first buffer-state-judging means and a positive determination by the second buffer-state-judging means, the complex data writing comprises at least one of a) repositioning the current storage area pointer to the leading storage area and b) resetting the difference number to indicate a current number of empty storage areas which is greater than the second predetermined number, to place the data buffer into the third state prior to carrying out the simple data writing, and so that in response to a negative determination by the second buffer-state-judging means, the second data-buffering means prevents carrying out the simple data writing until the data buffer is placed into the second state.

20. The data buffering device of claim 19, wherein the third buffer-state-judging means comprises first memory judging means for judging whether the difference number is greater than zero, the third buffer-state-judging means providing a positive judgement indicating that the data buffer currently is in the third state in response to a positive judgement by the first memory judging means, thereby allowing the first data buffering means to perform the simple data storing.

21. A data buffering device comprising:

a data buffer including a plurality of storage areas, each one of the plurality of storage areas capable of storing one of a plurality of data sets, the plurality of storage areas comprising a leading storage area, a trailing storage area and a predetermined sequence of intermediate storage areas between the leading and trailing storage areas;

a current storage area pointer for pointing to an empty one of the plurality of storage areas as a current storage area such that, after writing one of the plurality of data sets into the current storage area, the current storage area pointer is advanced to point to a following one of the plurality of storage areas as a next storage area, the next storage area following the current storage area in the predetermined sequence;

a current output area pointer for pointing to a first one of a plurality of filled storage areas as a current output area, each one of the plurality of filled storage areas having one of the plurality of data sets stored therein, such that, after reading one of the plurality of stored data sets from the current output area, the current output area pointer is advanced to point to a following one of the plurality of filled storage areas as a next output area, the next output area following the current output area in the predetermined sequence;

first memory means for storing a first difference number indicative of a number of filled storage areas and a second difference number indicative of a number of empty storage areas;

first buffer-state-judging means for determining whether the data buffer is in a first state wherein one of a) a current relationship between the current output area and the trailing storage area coincides with a predetermined relationship between the current output area and the trailing storage area, and b) a current relationship between the current storage area and the trailing storage area coincides with a predetermined relationship between the current storage area and the trailing storage area, thereby indicating a need to change one of a) the current output area pointer to point to the leading storage area as the current output area and b) the current storage area pointer to point to the leading storage area as the current storage area;

second buffer-state-judging means for determining whether the data buffer is in a second state wherein one of a) the current output area is greater than a first predetermined number of the plurality of storage areas from the current storage area and b) the current storage area is greater than a second predetermined number of the plurality of storage areas from the current output area;

third buffer-state-judging means for determining whether the data buffer is in a third state wherein one of a) the first difference number if greater than a third predetermined number, the third predetermined number being not greater than the first predetermined number and b) the second difference number is greater than a fourth predetermined number, the fourth predetermined number being not greater than the second predetermined number;

first buffer-state-judging means for carrying out one of a simple data reading and a simple data writing in response to a positive determination by the third buffer-state-judging means, the simple data reading comprising i) a data output operation, ii) a current output area advancing operation, and iii) decrementing the first difference number without operating the first and second buffer-state-judging means and the simple data writing comprising i) a data storage operation, ii) a current storage area advancing operation, and iii) decrementing the second difference number without operating the first and second buffer-state-judging means; and second data-buffering means for carrying out one of a complex data reading and a complex data writing by operating the first and second buffer-state-judging means in response to a negative determination by the third buffer-state-judging means so that in response to at least one of a positive determination by the first buffer-state-judging means and a positive determination by the second buffer-state-judging means, the complex data reading comprises at least one of repositioning the current output area pointer to the leading storage area and resetting the second difference number to indicate a current number of filled storage areas which is greater than the third predetermined number of the complex data writing comprises at least one of repositioning the current storage area pointer to the leading storage area and resetting the second difference number to indicate a current number of empty storage areas which is greater than the fourth predetermined number, to place the data buffer into the third state prior to carrying out one of the simple data reading and the simple data writing, and so that in response to a negative determination by the second buffer-state-judging means, the second data-buffering means prevents carrying out one of the simple data reading and the simple data writing until the data buffer is placed into the second state.

22. The data buffering device of claim 21, wherein the third buffer-state-judging means comprises:

first memory judging means for judging whether the first difference number is greater than zero, the third buffer-state-judging means providing a positive judgement indicating that the data buffer currently is in the third state in response to a positive judgement by the first memory judging means, thereby allowing the first data buffering means to perform the simple data reading; and second memory judging means for judging whether the second difference number is greater than zero, the third buffer-state-judging means providing a positive judgement indicating that the data buffer currently is in the third state in response to a positive judgement by the second memory judging means, thereby allowing said first data buffering means to carry out said simple data storing.

23. A data buffering device comprising:

a data buffer including a plurality of storage areas, each one of the plurality of storage areas capable of storing one of a plurality of data sets, the plurality of storage areas comprising a leading storage area, a trailing storage area and a predetermined sequence of intermediate storage areas between the leading and trailing storage areas;

a current storage area pointer for pointing to one of the plurality of storage areas as a current storage area such that, after writing one of the plurality of data sets into the current storage area, the current storage area pointer is advanced to point to a following one of the plurality of storage areas as a next storage area, the next storage area following the current storage area in the predetermined sequence;

a current output area pointer for pointing to a first one of a plurality of filled storage areas as a current output area, each one of the plurality of filled storage areas having one of the plurality of data sets stored therein, such that, after reading one of the plurality of stored data sets from the current output area, the current output area pointer is advanced to point to a following one of the plurality of filled storage areas as a next output area, the next output area following the current output area in the predetermined sequence;

first memory means for storing at least one of a) a first difference number indicative of a number of filled storage areas and b) a second difference number indicative of a number of empty storage areas;

first buffer-state-judging means for determining whether the data buffer is in a first state wherein at least one of a) a current relationship between the current output area and the trailing storage area coincides with a predetermined relationship between the current output area and the trailing storage area, and b) a current relationship between the current storage area and the trailing storage area coincides with a predetermined relationship between the current storage area and the trailing storage area, thereby indicating a corresponding need to change at least one of a) the current output area pointer to point to the leading storage area as the current output area of the data buffer and b) the current storage area pointer to point to the leading storage area as the current storage area of the data buffer;

second buffer-state-judging means for determining whether the data buffer is in a second state wherein at least one of a) the current output area is greater than a first predetermined number of the plurality of storage means from the current storage area and b) the current storage area is greater than a second predetermined number of the plurality of storage areas from the current output area;

third buffer-state-judging means for determining whether the data buffer is in a third state wherein at least one of a) the first difference number is greater than a third predetermined number, the third predetermined number being not greater than the first predetermined number and b) the second difference number is greater than a fourth predetermined number, the fourth predetermined number being not greater than the second predetermined number;

first data-buffering means for carrying out at least one of a) a simple data reading and b) a simple data writing in response to a positive determination by the third buffer-state-judging means, the simple data reading comprising i) a data output operation, ii) a current output area advancing operation, and iii) decrementing the first difference number without operating the first and second buffer-state-judging means and the simple data writing comprising i) a data storage operation ii) a current storage area advancing operation, and iii) decrementing the second difference number without operating the first and second buffer-state-judging means; and second data-buffering means for carrying out at least one of a complex data reading and a complex data writing by operating the first and second buffer-state-judging means in response to a negative determination by the third buffer-state-judging means so that in response to at least one of a positive determination by the first buffer-state-judging means and a positive determination by the second buffer-state-judging means the complex data reading comprises at least one of repositioning the current output area pointer to the leading storage area and resetting the first difference number to indicate a current number of filled storage areas which is greater than the third predetermined number and the complex data writing comprises at least one of repositioning the current storage area pointer to the leading storage area and resetting the second difference number to indicate a current number of empty storage areas which is greater than the fourth predetermined number, to place the data buffer into the third state prior to carrying out at least one of the simple data reading and the simple data writing, and for preventing carrying out at least one of the simple data reading and the simple data writing in response to a negative determination by the second buffer-state-judging means until the data buffer is placed into the second state.

* * * * *